United States Patent [19]
Rao

[11] Patent Number: 5,923,788
[45] Date of Patent: Jul. 13, 1999

[54] IMAGE PROCESSING APPARATUS

[75] Inventor: Gururaj Rao, Yokohama, Japan

[73] Assignee: Kabushiki Kaisha Toshiba, Kanagawa-Ken, Japan

[21] Appl. No.: 08/611,080

[22] Filed: Mar. 5, 1996

[30] Foreign Application Priority Data

Mar. 6, 1995 [JP] Japan ..................................... 7-045660

[51] Int. Cl.⁶ .................................................. G06K 9/40
[52] U.S. Cl. .......................... 382/275; 382/282; 358/448; 358/452
[58] Field of Search ..................................... 382/275, 282, 382/291, 309, 254; 358/448, 452, 453, 447

[56] References Cited

U.S. PATENT DOCUMENTS

| | | | |
|---|---|---|---|
| 4,899,227 | 2/1990 | Yamada | 358/452 |
| 5,134,503 | 7/1992 | Kimura | 358/447 |
| 5,448,376 | 9/1995 | Ohta | 358/448 |

FOREIGN PATENT DOCUMENTS

| | | | |
|---|---|---|---|
| 0442054A3 | 11/1990 | European Pat. Off. | G06F 15/40 |
| 0557099A1 | 2/1993 | European Pat. Off. | H04N 1/40 |
| A4273767 | 9/1992 | Japan | H04N 1/38 |
| A4245860 | 1/1993 | Japan | H04N 1/387 |
| 2264560 | 3/1993 | United Kingdom | G03G 15/40 |

*Primary Examiner*—Thomas D. Lee
*Attorney, Agent, or Firm*—Limbach & Limbach LLP

[57] ABSTRACT

There is provided an image processing apparatus capable of easily removing or suppressing an area which need not be copied in an image. A characteristic amount calculation section detects rectangular areas physically/logically connected to each other from an image read by a scanner, and calculates unnecessary area information required to detect the characteristic amount and unnecessary area of the rectangular areas. An unnecessary area identifying section compares the characteristic amount of each object with unnecessary area identifying reference information based on the unnecessary area information to detect whether the object is an unnecessary area. An output processing section removes or filters the detected unnecessary area according to a specified method to store the unnecessary area in an output image storage section.

12 Claims, 14 Drawing Sheets

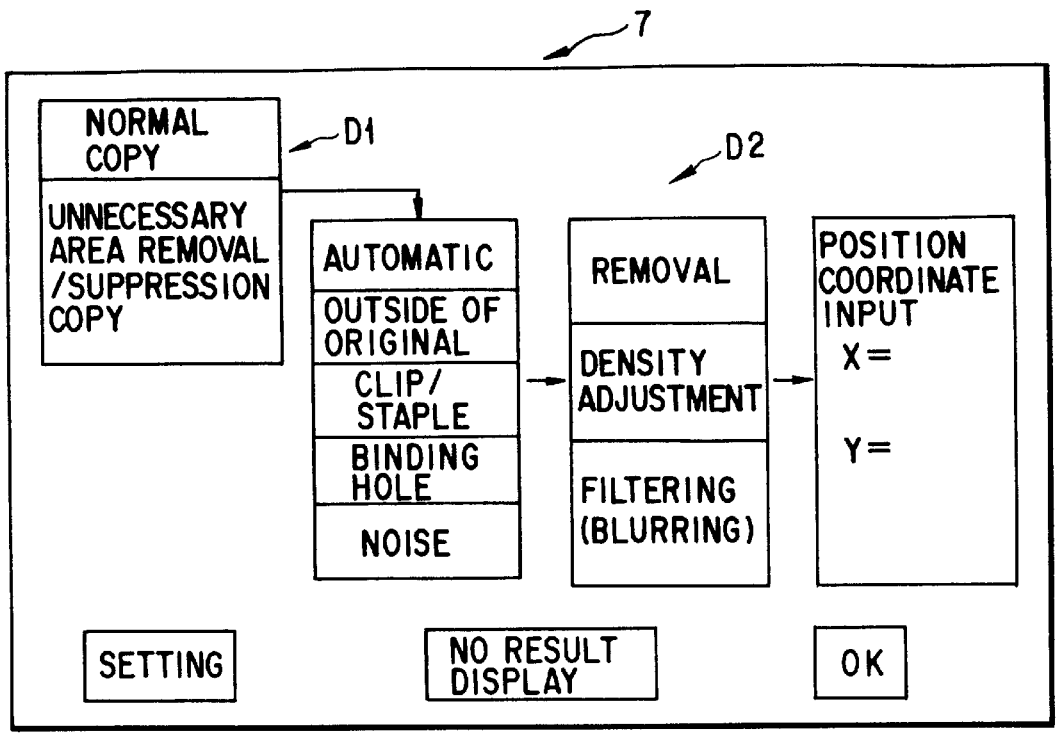
F I G. 2A
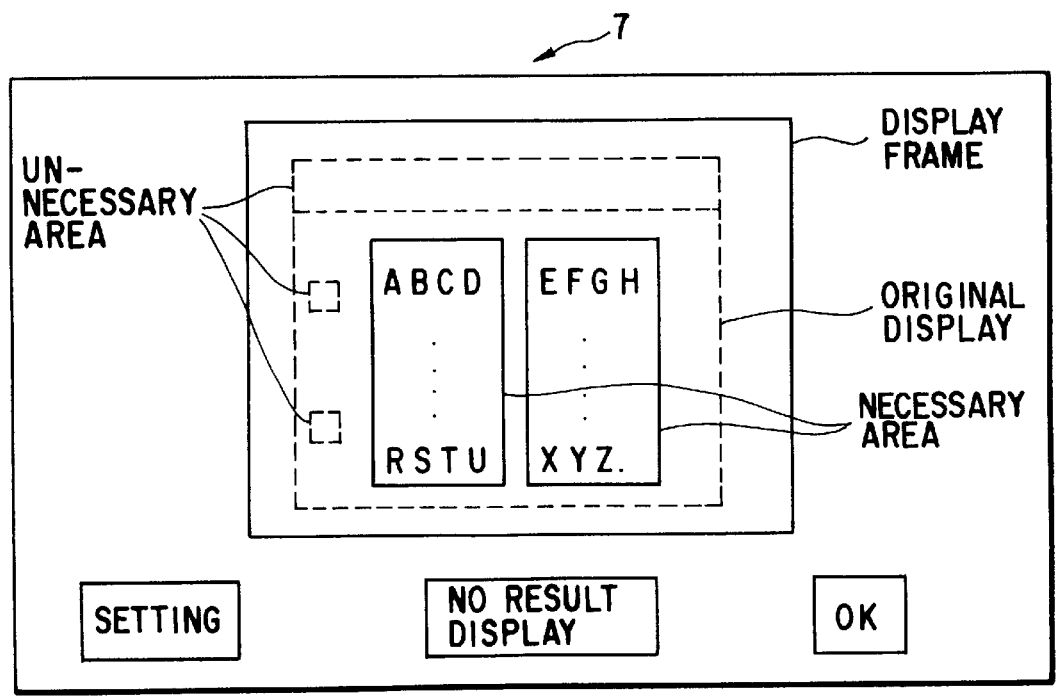
F I G. 2B

| OUT OF ORIGINAL | |
|---|---|
| X0 | 0 |
| Y0 | 0 |
| Xm | 4096 |
| Ym | 4096 |
| GGs | FILTERING (11) |
| CLIP/STAPLE | |
| X'0 | 30 |
| Y'0 | 20 |
| X'm | 4000 |
| Y'm | 3900 |
| Lxm | X'm/10 : 400 |
| Lym | Y'm/10 : 390 |
| CSS | DENSITY ADJUSTMENT (10) |

FIG. 3

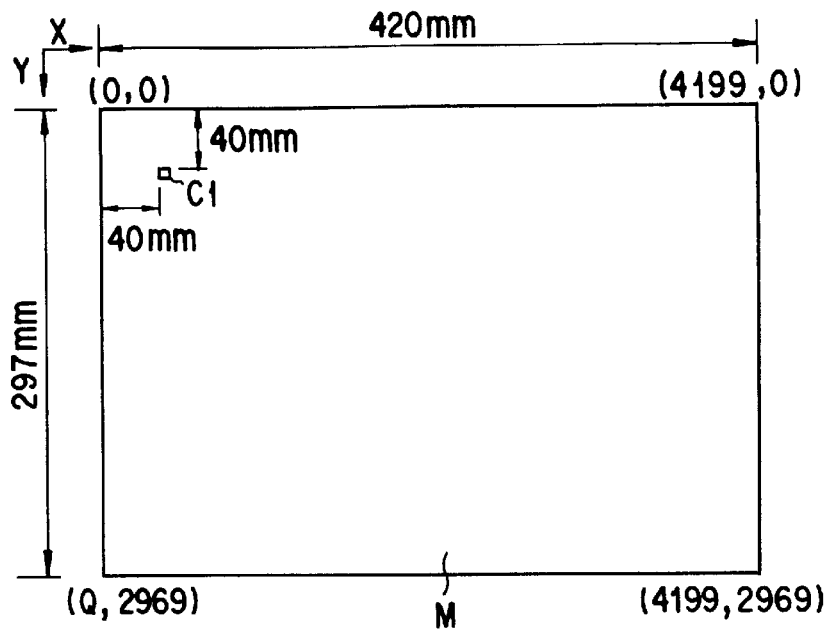
FIG. 4
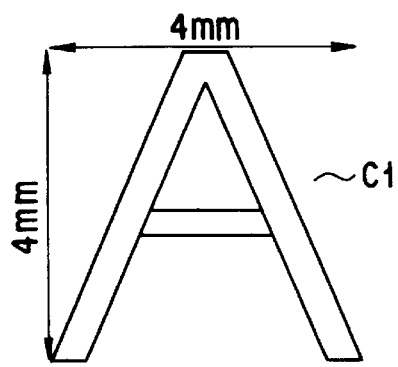
FIG. 5
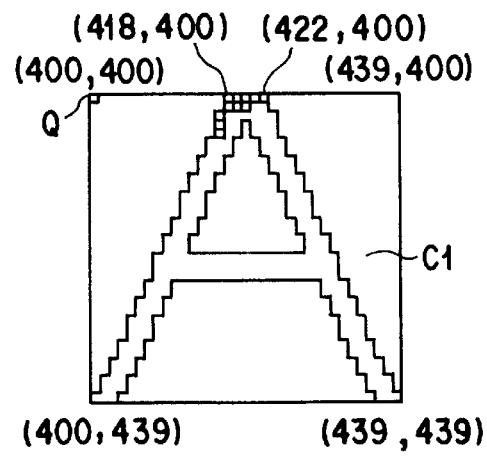
FIG. 6
| Y \ X | 416 | 417 | 418 | 419 | 420 | 421 | 422 | 423 | 424 | 425 |
|---|---|---|---|---|---|---|---|---|---|---|
| 400 | 10 | 30 | 220 | 230 | 240 | 240 | 245 | 200 | 90 | 30 |
| 401 | 22 | 128 | 250 | 245 | 249 | 240 | 240 | 230 | 189 | 100 |
| 402 ⋮ | | | | | | | | | | |
FIG. 7

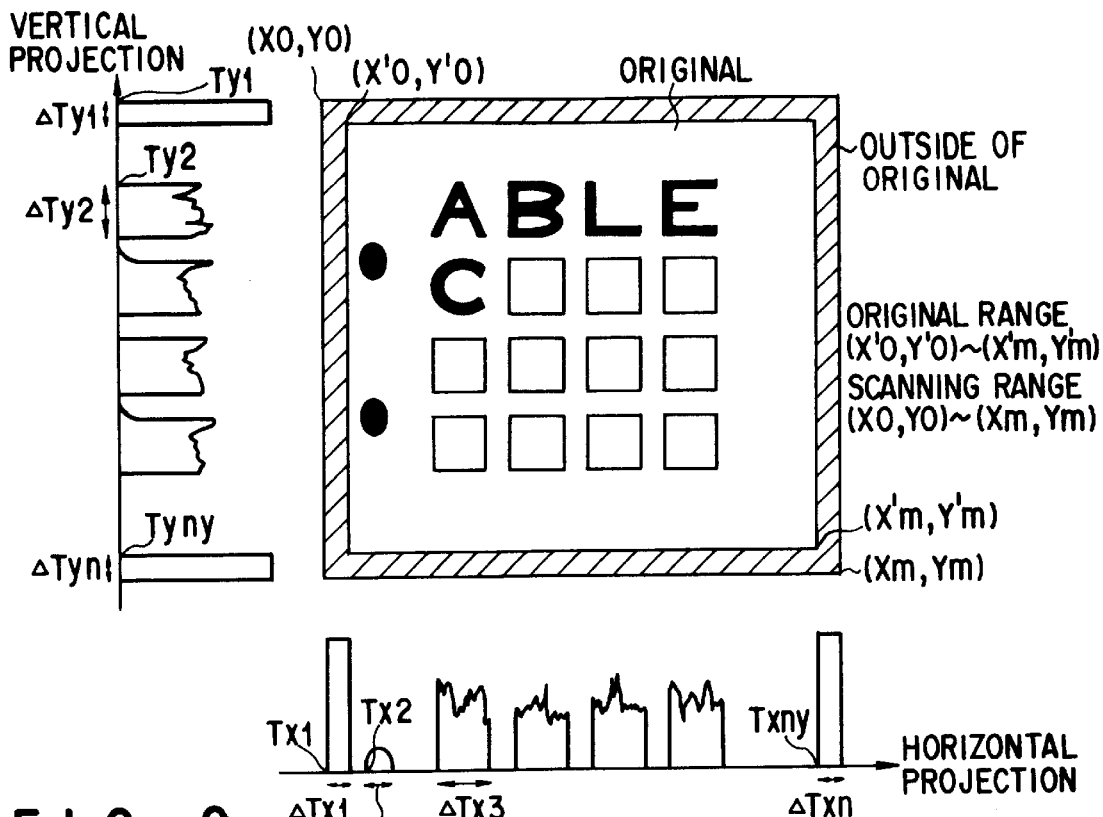
FIG. 9
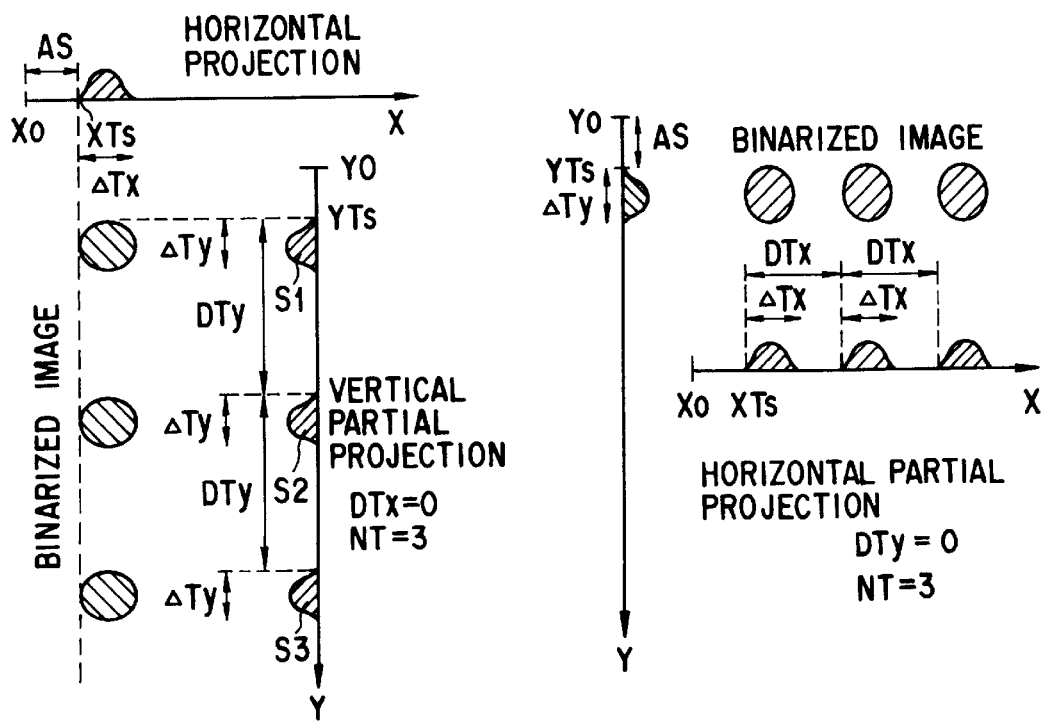
FIG. 10A
FIG. 10B

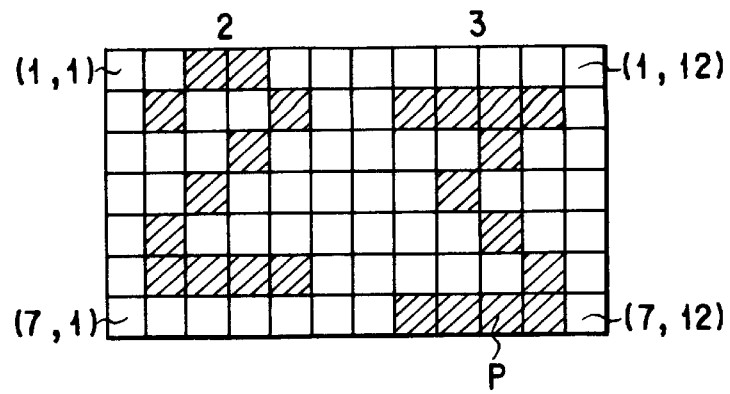
FIG. 11A
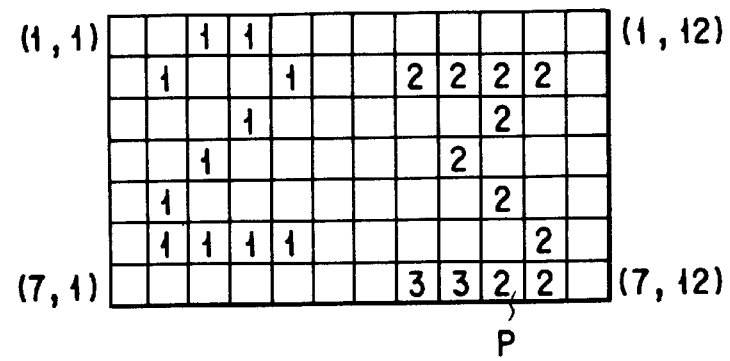
FIG. 11B
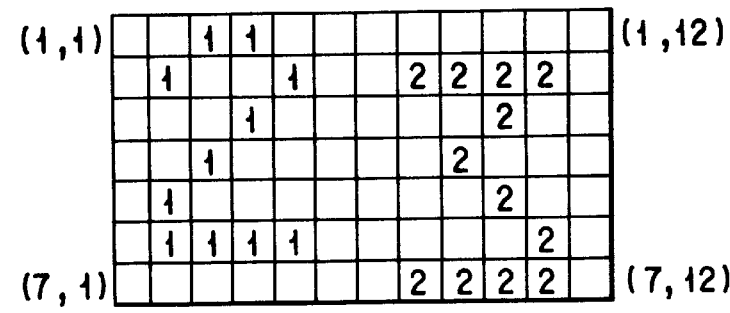
FIG. 11C
| PHYSICAL BLOCK | START POINT COORDINATE | | END POINT COORDINATE | |
|---|---|---|---|---|
| | XS | YS | XE | YE |
| 1 | 2 | 1 | 5 | 6 |
| 2 | 8 | 2 | 11 | 7 |
FIG. 11D

```
4
┌─────────────────────────────────────────┐
│ THE NUMBER OF OBJECTS : ON              │
│ (XS1,XS1)  START POINT COORDINATE OF OBJECT 1 │
│ (△X1, △y1) SIZE OF OBJECT 1             │
│ (XS2,YS2)  START POINT COORDINATE OF OBJECT 2 │
│ (△x2, △y2) SIZE OF OBJECT 2             │
│                                         │
│                                         │
│ (XS ON, YS ON)                          │
│ (△XON, △YON)                            │
└─────────────────────────────────────────┘
```

FIG. 13

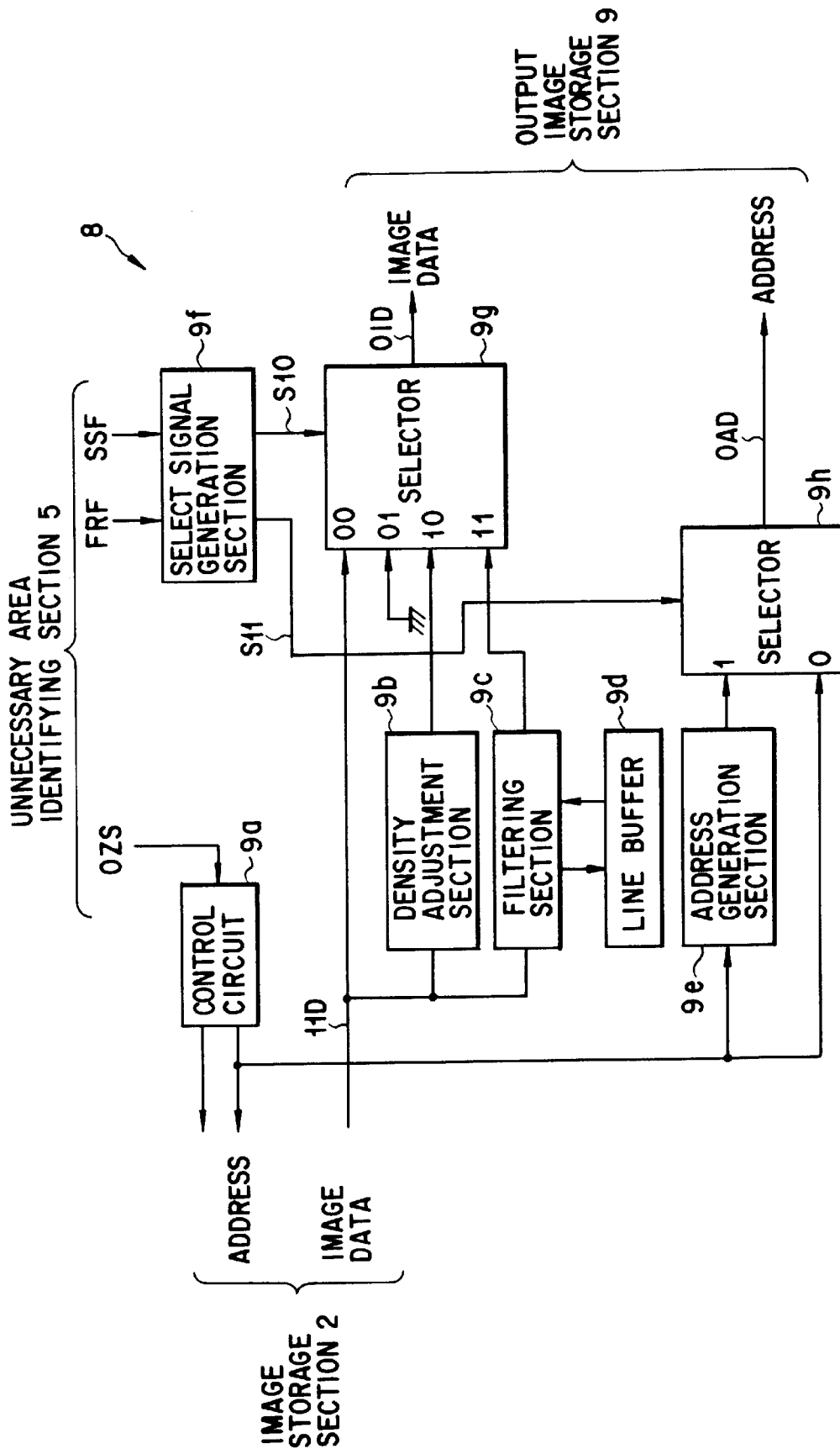
F I G. 20

IMAGE PROCESSING APPARATUS

BACKGROUND OF THE INVENTION

1. Field of the Invention

The present invention relates to an image processing apparatus for performing an image process for forming, e.g., a copy image of an image.

2. Description of the Related Art

For example, in an image processing apparatus in which an original such as a document is scanned to read the image of the original and form a copy image of the original, i.e., in which an image on the original is copied, the characteristics of local areas are inspected in units of pixels of the read image, the area are separated from each other, and each pixel is processed, thereby copying the image.

In a copying process performed in units of pixels, for example, when a scanning range in copying of a document is larger than the original in size, the shadow outside of the original is also copied. In addition, a shadow formed by thickness of the original and the shadows of a binding hole, a clip, a staple, and dents thereof are directly copied. Therefore, the quality and look of the resultant copy are degraded.

SUMMARY OF THE INVENTION

It is an object of the present invention to provide an image processing apparatus in which, when an image is to be copied, an unnecessary area is determined on the basis of the image area, thereby determined on the basis of the image area, thereby easily removing or suppressing the unnecessary area.

In order to achieve the above objective, according to one aspect of the present invention, there is provided an image processing apparatus which reads an original image and performs an image process for forming a copy image corresponding to the original image, comprising: means for reading the original image; means for calculating characteristics of the original image; means for identifying unnecessary image information on the basis of the characteristics of the image calculated by the calculating means; and means for correcting the unnecessary image identified by the identifying means to form a copy image corresponding to the original image.

The read image of the original is stored in an image storage section, a characteristic amount calculation section performs a projection process, a binarizing process, an 8-neighbor-connectedness component extracting process, and a labeling/grouping process to the image stored in the image storage section to extract objects (rectangular area) physically, logically connected to each other. The characteristic amounts of the objects are calculated, and a geometric characteristic amount (unnecessary area characteristic information) is calculated and stored in an unnecessary area information storage section. An unnecessary area identifying section compares the characteristic amount of each object with unnecessary area identifying reference information stored in the unnecessary area information storage section to detect an unnecessary area such as the outside shadow of the original, the shadow of the thickness of a book, the shadow or dent of a staple or a clip, the shadow or dent of a binding hole, or small noise. An output processing section performs assigned processes ("removal", "density adjustment", and "filtering") to the image of the detected unnecessary areas. As a result, an image output section can form a copy image of the image of an area which must be copied, and the unnecessary area which need not be copied can be easily removed or suppressed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2A and 2B are views for explaining a concrete example of the display and setting method of a man-machine interface section;

FIG. 3 is a view showing a storage example of an unnecessary area information storage section in FIG. 1;

FIG. 4 is a coordinate display of the image of an original input from an image input section;

FIG. 5 is a concrete example of a character on the original input from the input section;

FIG. 6 is a view showing a coordinate display of the character on the image of the original input from the image input section;

FIG. 7 is a view showing a concrete example of the relationship between sampling coordinates and pixel values with respect to the image of the character in FIG. 6;

FIG. 9 is a view for explaining the principle of a projection process for an image;

FIGS. 10A and 10B are views for explaining the principle of a method of detecting a binding hole area, in which FIG. 10A shows a case wherein a binding holes are present along the longitudinal direction of the original, and FIG. 10B shows a case wherein binding holes are present along the lateral direction of the original;

FIGS. 11A to 11D are views for explaining a method of detecting objects (rectangular area) in the characteristic amount calculation section;

FIGS. 12A and 12B are views for explaining a method of calculating a connectedness component in an 8-neighbor-connectedness component extracting section in FIG. 8;

FIG. 13 is a storage example of a characteristic amount in a characteristic amount storage section in FIG. 1;

FIG. 20 is a schematic block diagram showing the arrangement of an output processing section in FIG. 1;

DETAILED DESCRIPTION OF THE PREFERRED EMBODIMENTS

An embodiment of the present invention will be described below with reference to the accompanying drawings.

Figure 1:
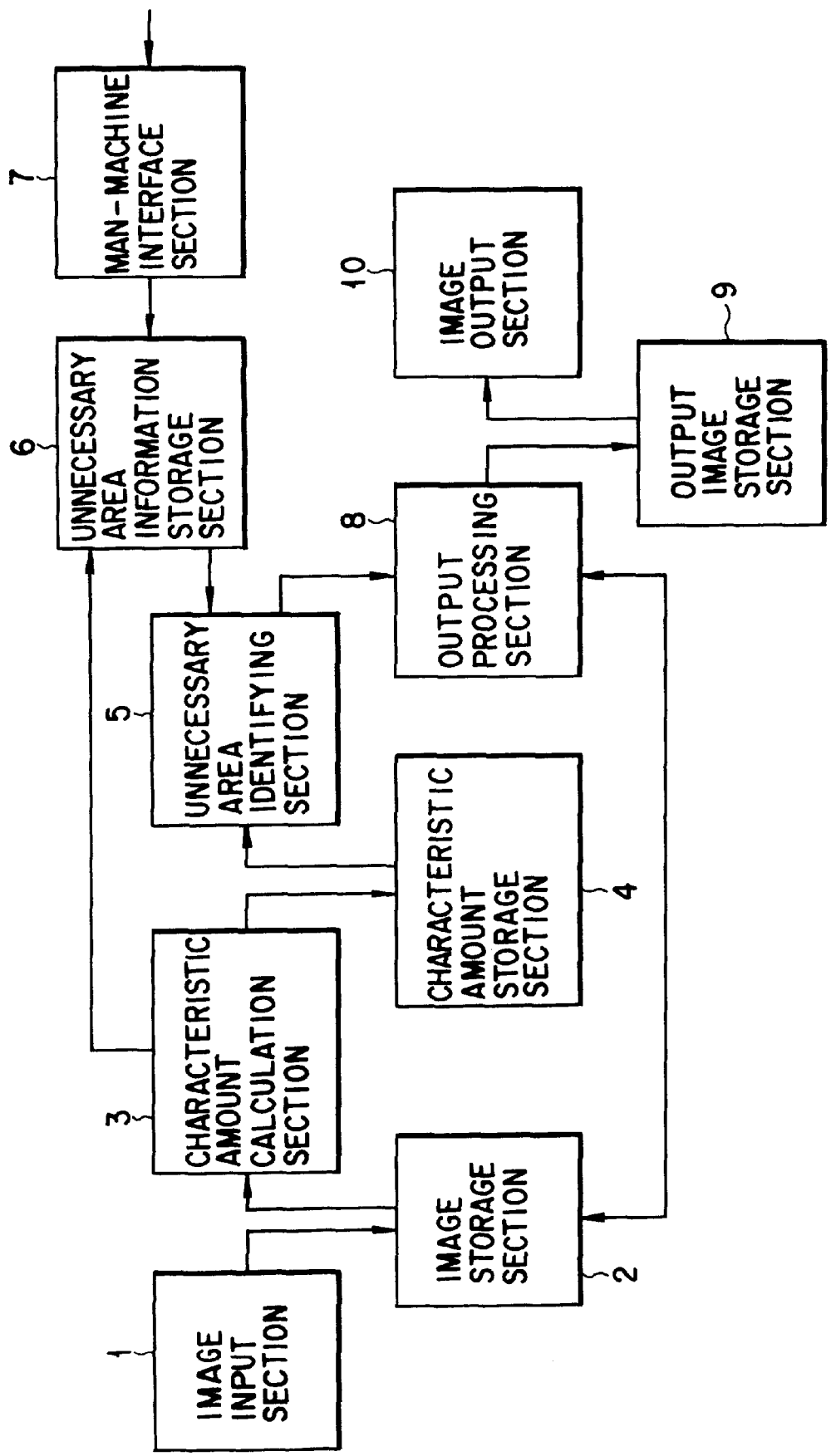
FIG. 1 is a schematic block diagram showing the arrangement of an image processing apparatus according to an embodiment of the present invention.

FIG. 1 shows the entire arrangement of an image processing apparatus according to the present invention. Referring to FIG. 1, an image input section 1 reads an image from an original such as a given document by using an image input apparatus such as a scanner. An image storage section 2 temporarily stores image data read by the image input section 1.

A characteristic amount calculation section 3 detects characteristics such as the start point coordinates and dimensions (sides) of areas (to be referred to as objects hereinafter) in which characters are physically, logically connected to each other on the basis of projection of the entire image stored in the image storage section 2, and transmits the characteristics to a characteristic amount storage section 4 as the characteristic amounts of the objects. These objects include not only characters and signs but also an unnecessary portion such as punch holes. In addition, the characteristic amount calculation section 3 performs vertical/horizontal projection to each object to calculate geometric characteristics (unnecessary area reference information) for determining an unnecessary area, and transmits the geometric characteristics to an unnecessary area information storage section 6.

The characteristic amount storage section 4 temporarily stores the characteristic amount of each object from the characteristic amount calculation section 3. An unnecessary area identifying section 5 checks, on the basis of the characteristic amount of each object stored in the characteristic amount storage section 4 and the unnecessary area identifying reference information stored in the unnecessary area information storage section 6, whether each object is an unnecessary area. If the object is an unnecessary area, the unnecessary area identifying section 5 instructs an output processing section 8 to perform an output process to the object.

A man-machine interface 7 displays an input instruction guide for an operator of this apparatus. The operator, according to this guide, performs inputting or the like of information for assigning various processes by using a touch panel or the like. The man-machine interface 7 is an input/output means for displaying a result identified by setting of a user or automatic determination and performing a corresponding process in response to the approval of the user.

FIGS. 2A and 2B shows a man-machine interface using a touch panel. FIG. 2A shows a screen display used when a user sets a parameter. When the user presses (touches) "set" displayed on the lower left portion of the screen, POPUP menu shown in FIG. 2A is displayed, setting can be performed by the user. For example, as shown in 2A, when D1 menu is displayed first, and "unnecessary area removal/suppression copy" is selected, POPUP menu indicated by D2 is displayed. For this reason, all unnecessary areas (for example, the outside of an original, a clip/staple, a binding hole, noise, and the like) which are defined in advance, or some of these items can be selected. In addition, processes to be performed to selected areas can be selected. For example, setting can be performed such that the outside and noise of an origin are removed, and density adjustment is performed to a clip/staple. Coordinate setting can also be performed such that a process related to a target unnecessary area is performed to only a selected area of the original. For example, only removal of noise which is present at a border of the original can be set. When the user sets a desired process and presses "OK", the data of the process is input, and the corresponding process is performed.

In "no result display" in FIG. 2A, when TOGGLE switch is pressed, a "no result display" state is changed into a "result display" state shown in FIG. 2B. When "result display" is pressed, the "result display" state is changed into "no result display" state. In the "no result display" state, as shown in FIG. 2B, an identification result is displayed once, a corresponding process is performed in response to the approval of the user.

When the displayed identification result is a result desired by the user, "OK" is pressed and the process corresponding to the result is performed. If the result which is not desired by the user is erroneously identified, the result can be corrected. For example, an unnecessary area item set by the user is displayed on the screen such that the unnecessary area is surrounded by colored (e.g., red) frame. When the user presses (touches) the frame that the user wants to remove the unnecessary area item from objects to be processed, the color of the frame changes (e.g., from red to blue), the area surrounded by the frame having the changed color is removed from the object to be processed. When the erroneous identification is corrected by the user as described above, identification accuracy can be increased, processes desired by the user can be performed. In addition, an area erroneously corrected by the user can also be returned to an original state by specifying (pressing or touching) the frame of the area again.

Furthermore, different colors can be given to identification items and processes to make the display legible. For example, the various unnecessary areas such as the outside of an original and a clip can be displayed by different colors, respectively, colors of processes can be differed from each other such that a removing process has red and an adjusting process has green.

As described above the man-machine interface 7 is a means for making it possible that setting is performed by a user or that confirmation, correction, or the like of identified items. The instruction information set as described above is transmitted to the unnecessary area information storage section 6 and temporarily stored in it.

In the unnecessary area information storage section 6, characteristics serving as references for identifying unnecessary areas such as preset values (the maximum dimension of a clip or a staple, general positions thereof, and the like), information set by the man-machine interface 7, a scanner read range calculated by the characteristic amount calculation section 3, an original range, and the like are stored. The unnecessary area information storage section 6 gives the pieces of information to the unnecessary area identifying section 5 as unnecessary area identifying reference information.

FIG. 3 shows a storage example in the unnecessary area information storage section 6. When the outside of the original is to be identified by the unnecessary area identifying section 5, for example, a scanner read range (X0, Y0) to (Ym, Ym) is stored as information required for the identification, and unnecessary area identifying reference information indicating that an output process is performed by filtering is stored as output process instruction information GSS.

When the areas of a clip and a staple are to be detected, for example, an original range (X'0,Y'0) to (X'm,Y'm), the maximum size (Lxm,Lym) of the clip, and the like are stored as information required for the detection, and unnecessary area identifying reference information indicating that an output process is performed by density adjustment is stored as the output process instruction information GSS.

In the output processing section 8, after an identifying process (unnecessary area detecting process) is performed by the unnecessary area identifying section 5, original image data corresponding to each object is read from the image storage section 2. If the target object is an unnecessary area, the output processing section 8 performs processes assigned through the man-machine interface 7, the unnecessary area information storage section 6, and the unnecessary area identifying section 5, and outputs the resultant data to an output image storage section 9.

The output image storage section 9 temporarily stores image data from the output processing section 8. The image output section 10 performs control such that an image subjected to an output process is read from the output image storage section 9 and output to an output device such as a printer.

Each section of the image processing apparatus shown in FIG. 1 will be described below in detail.

A process of reading an image from an original given by the image input section 1 will be described first.

The image input section 1 reads the image of the original by, e.g., a scanner or the like. For example, a scanner which reads an image at 10 pixels/mm and 8 bits is used, the information of the original is sampled at an interval of 10 pixels (0.1 mm pitch) per 1 mm.

FIGS. 4 to 6 shows a case wherein the scanner reads a character "A" C1 is read from an original M. The A3-size (420 mm' 297 mm) original M is sampled at a 0.1-mm pitch, the number of pixels after the sampling becomes 4,200' 2,970. When a pixel value per pixel is expressed by 256-gradation, data having about 12 Mbytes can be obtained. Assume that the upper left corner of the original M shown in FIG. 4 is set as an origin, and that the character "A" C1 is present at a position 40 mm apart from the origin in an X direction (horizontal direction) and 40 mm apart from the origin in a Y direction (vertical direction).

When the character C1 has a size of 4 mm' 4 mm as shown in FIG. 5, after sampling, as shown in FIG. 6, the start point coordinates of the character become (400,400), and the end point coordinates of the character become (439,439). The sampling is performed in units of areas Q, each area Q is called a pixel, and the value of each area Q is set as a pixel value. For example, assume that a sampling value at a position of 41.8 mm in the vertical direction and 40 mm in the horizontal direction is 220. This sampling value is set as the pixel value of coordinates (418,400).

FIG. 7 shows a concrete example of the relationship between sampling coordinates and pixel values with respect to the character C1.

The image storage section 2 stores addresses, i.e., pixel values in correspondence with sampling coordinates. Each pixel value expresses the density of a pixel at the coordinates of the pixel. That is, the pixel value is in proportion to the degree of density of the pixel.

The characteristic amount calculation section 3 reads an image from the image storage section 2, and performs entire projection, partial projection, and the like to the image to calculate the number of objects in the image, the start point coordinates (Xs,Ys) and size ($\Delta x, \Delta y$) of each object, and the like as geometric characteristic amounts. The characteristic amount calculation section 3 transmits the geometric characteristic amounts to the characteristic amount storage section 4. In addition, the characteristic amount calculation section 3 calculates, as parameters serving references for determining an area as an unnecessary area, scanning start/end coordinates, original start/end coordinates, (if binding holes are present) the start point, size, and inter-hole distance between the binding holes, and transmits these parameters to the unnecessary area information storage section 6 as unnecessary area information.

The characteristic amount calculation section 3 will be described below with reference to FIG. 8.

Figure 8:
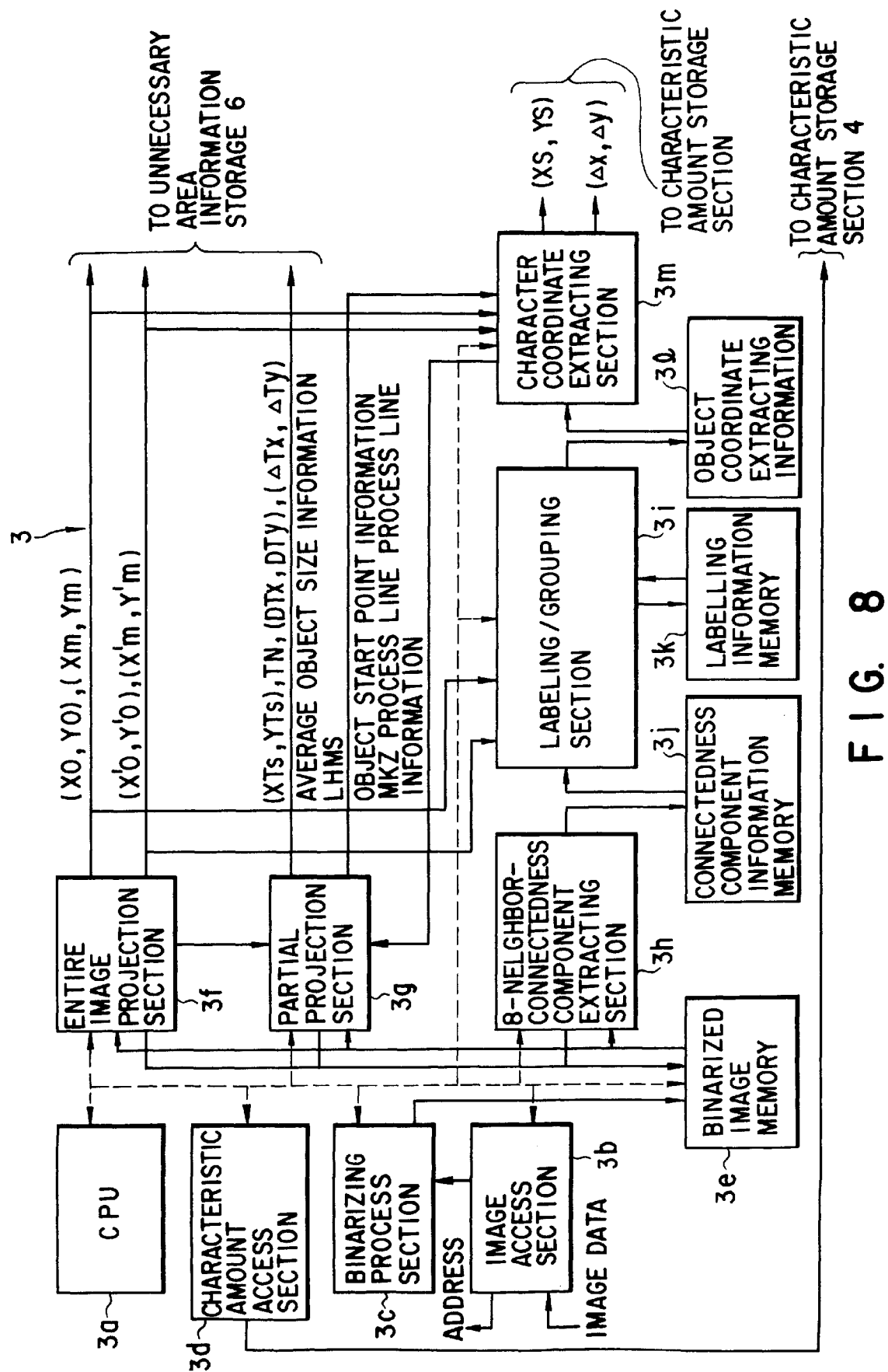
FIG. 8 is a schematic block diagram showing the arrangement of a characteristic amount calculation section.

Referring to FIG. 8, a CPU 3$a$ is connected to the sections constituting the characteristic amount calculation section 3, controls all the sections of the characteristic amount calculation section 3 to execute a characteristic amount calculating process.

An image access section 3$b$ assigns an address to read image data (i.e., pixel values) stored in the image storage section 2.

A binarizing process section 3$c$ receives the image data read by the image access section 3$b$ from the image storage section 2, and binarizes the image data. More specifically, the binarizing process section 3$c$ compares the read pixel values with a preset threshold value. If the target pixel value is larger than the threshold value, a binarized output is set to be 1 (black dot); otherwise, the binarized output is set to be 0 (white dot).

A binarized image memory 3$e$ is a memory for storing the image binarized by the binarizing process section 3$c$.

A characteristic amount access section 3$d$ generates, on the basis of the image data stored in the image storage section 2, addresses, control signals, and the like for storing the calculated characteristic amounts of the objects in the characteristic amount storage section 4 (see FIG. 1).

An entire image projection section 3$f$ performs vertical/horizontal projection to the entire image of the original. On the basis of a preset threshold value, if the number of pixels is smaller than the threshold value, 0 is set; otherwise, the number of pixels is left. The projection means that the numbers of only black pixels in the vertical and horizontal pixel rows are counted, and the resultant values are used as projection values of the corresponding rows and columns. The principle of the processing method will be described below with reference to FIG. 9.

For example, when the threshold value is set to be 3% of the numbers of pixels to be added, and a projection value is calculated, various information and sizes in the image are calculated. FIG. 9 shows a case wherein a scanner read range is larger than the original. When the start point coordinates of each crest of vertical/horizontal projection, i.e., Tyi (i=1, 2, . . . , ny) in the vertical direction and Txj (j=1, 2, 3, . . . , nx) in the horizontal direction and the widths of each crest, i.e., $\Delta$Tyi (i=1, 2, . . . , ny) in the vertical direction and $\Delta$Txj (j=1, 2, 3, . . . , nx), are calculated, character string intervals and character intervals in the image and the width of the outside of the original can be obtained.

Calculation for an original range will be described below.

As shown in FIG. 9, assume that a start value (X0,Y0) of scanning is (0,0), and that the end value is set to be (Xm,Ym). At this time, when the coordinate of the start point Ty1 of the first crest of the vertical projection is 0 (Ty1=0), the start point coordinate Y'0 of the original range in the vertical direction is given by:

$$Y'0 = Y0 + \Delta Yy1 \qquad (1)$$

On the other hand, when the coordinate of the start point Ty1 of the first crest of the vertical projection is not 0, the start point coordinate Y'0 is given by:

$$Y'0 = Y0 \qquad (2)$$

When the coordinate the end point of the last crest in the vertical direction is (Tyny+ΔTyn−Ym), the end point coordinate Y'm of the original range in the vertical direction is given by:

$$Y'm = Ym - \Delta Tyny \qquad (3)$$

When (Tyny+ΔTyn≠Ym), Y'm is given by:

$$Y'm = Ym \qquad (4)$$

Similarly, X'0 and X'm can be calculated by projection in the horizontal direction.

As a result, a scanning range (X0,Y0) to (Xm,Ym) and an original range (X'0,Y'0) to (X'm,Y'm) are obtained. The scanning range and the original range are stored in the unnecessary area information storage section 6 as unnecessary area information.

A partial projection section 3 receives, from the entire image projection section 3f, information such as the start point of a crest of vertical/horizontal projection, the width of a crest, a scanning range, and an original range. The partial projection section 3g receives, from the binarized image memory 3e, binary image data corresponding to the pieces of information of the start point and width of each crest of the vertical projection, i.e., binarized image data of each row. The partial projection section 3g performs a projection process in only the horizontal direction to the binarized image data read from the binarized image memory 3e. With this partial projection, the number of objects in the horizontal direction in crests of the vertical projection, start point information MKZ of each object, and average object size information LHMS expressed as the length of the horizontal projection are calculated. The calculated values are input to an character coordinate extracting section 3m.

In addition, the partial projection section 3g reads binary image data which are closest to the original start and end coordinates (in a predetermined range AS (e.g., within 100 pixels)) and correspond to the start points and widths of the crests of vertical and horizontal projection, and checks whether the area defined by the binary image data is an area corresponding to binding holes. The principle of this method will be described below with reference to FIGS. 10A and 10B.

FIG. 10A shows a case wherein binding holes are arranged in the vertical direction. With respect to the crests of projection having any part included within the predetermined range AS from the origin in the horizontal direction, partial projection in the vertical direction of the image is performed, thereby checking a binding hole area. If the integration values, widths, intervals, and the like of the crests (S1, S2, and S3 in FIG. 10A) of the partial projection are constant, the area is determined as a binding hole area.

The total number (TN) of binding holes, the start address (XTs,YTs) of the binding holes, the size (ΔTx,ΔTy) of each binding hole, the intervals (DTx,DTy) of the binding holes, and the like are calculated, and these values are stored in the unnecessary area information storage section 6 as unnecessary area information.

FIG. 10B shows a case wherein binding holes are arranged in the horizontal direction of the original. As in the case in FIG. 10A, with respect to the crests of projection included within the predetermined range AS from the origin in the vertical direction, partial projection in the horizontal direction of the image is performed, thereby checking a binding hole area.

In addition, the characteristic amount calculation section 3 calculates the coordinates of the objects of the read original on the basis of the binarized image stored in the binarized image memory 3e. This process is performed by an 8-neighbor-connectedness component extracting section 3h, a labeling/grouping section 3i, and the character coordinate extracting section 3m in units of a crest in the same manner as that in the partial projection section 3g. The method of this process will be briefly described below with reference to FIG. 11.

In this case, for example, as shown in FIG. 11A, the description is based on the binarized images of numbers "2" and "3" stored in the binarized image memory 3e.

According to the process by the 8-neighbor-connectedness component extracting section 3h, connectedness components shown in FIG. 11B are calculated, and the connectedness components are labeled. In the labeling/grouping section 3i, as shown in FIG. 11C, uniting of equalized groups or the like is performed. On the basis of these groups, the start point coordinates and end point coordinates of a connected component block are obtained as shown in FIG. 11D.

A connected component calculating method in the 8-neighbor-connected component extracting section 3h will be described below with reference to FIGS. 12A and 12B. FIGS. 12A and 12B show neighbor cells required to obtain the connected components of a target pixel P shown in FIG. 11A. In order to obtain the connected components of the pixel P, the following process is performed.

1) When the value of the pixel P is "0", the label of the pixel P is set to be "0".
2) When the value of pixel P is "0", and all the labels of neighbor pixels A, B, C, and D which are processed in advance are "0", a new label is given to the pixel P.
3) When the value of the pixel P is "1", and at least one of the pixels A, B, C, and D has a label other than "0", one label other than "0" is selected (e.g., the smallest label) from the labels, and the selected label is defined as the label of the pixel P. At the same time, it is recorded that all other labels other than "0" are equal to each other. For example, as shown in FIG. 11A, when the pixel P having coordinates (7,10) is defined as a pixel to be processed, at this time, the neighbor pixels A, B, and C shown in FIG. 12A are processed in advance and labeled as shown in FIG. 12B.

Since the target pixel P has a value of "1", when the minimum label other than "0" is selected from the neighbor pixels, this label is "2". For this reason, assume that the label of the target pixel P is set to be "2". In addition, since a pixel which is different from the target pixel P having a label other than "0" and is labeled as "3" is present in the neighbor pixels, it is stored that label 2 is equivalent to label 3. More specifically, the label values (connectedness component label data) and equivalent label information (equivalent label data) of the pixels are stored in a connected component information memory 3j.

The labeling/grouping section 3i reads the connected component label data and equivalent label data from the connected component information memory 3j, and groups equivalent labels. That is, the labels shown in FIG. 11B are converted into new labels shown in FIG. 11C. More specifically, in the case shown in FIG. 11B, since label "3" is equivalent to label "2", label "3" is converted into label "2". The information is stored in a labeling information memory 3k.

The labeling/grouping section 3i performs new labeling to the equivalent labels again, scans the labeling information memory 3k, and reads the minimum and maximum coordinates of pixels having the same label. Since the pixels having the same label represents physical blocks united into one, the minimum coordinates are the start point coordinates of the physical blocks, and the maximum coordinates are the end point coordinates of the physical blocks. The pieces of coordinate information are stored in an object coordinate extraction information memory 3l.

If the original range (X'0,Y'0) to (X'm,Ym) is different from the scanning range (X0,Y0) to (Xm,Ym), unnecessary area blocks appear at the upper, lower, left, and right sides. For example, when an unnecessary area block is present on the upper side, the coordinates of the unnecessary area are (X0,Y0) to (Xm,Y'0). Therefore, before the re-labeling is performed, all the labels related to this area are set to be 0, and the start and end points of the physical block are stored in the object coordinate extraction information memory 3l. A process similar to this process is also performed to other areas (unnecessary areas) out of the original.

The object coordinate extraction information memory 3l unites the physical blocks on the basis of the average object size information LHMS and the start point information MKZ of each object which are output from the partial projection section 3g. With this process, the coordinates of one character constituted by, e.g., a plurality of connectedness components. In this process, a physical block which is present within the range of an average object size from the start point of the object is determined as one character. The minimum coordinate data of the coordinate data of the united blocks the start point coordinate data of a target character, and the maximum coordinate data is the end point coordinate data of the character. For example, assume that the start point coordinates and end point coordinates of one physical block (block 1) are set to be (xs1,ys1) and (xe1,ye1), respectively, and that the start point coordinates and end point coordinates of the other physical block (block 2) are set to be (xs2,ys2) and (xe2,ye2), respectively. In this case, the start and end coordinates (xs,ys) and (xe,ye) and sizes $\Delta x$ and $\Delta y$ of a block obtained by uniting the above physical blocks are given by:

$xs=min\ (xs1,xs2)$ $ys=min\ (ys1,ys2)$ $xs=max\ (xs1,xs2)$ $ys=max\ (ys1,ys2)$ $\Delta x=xe-xs\ \Delta y=ye-ys$ This process is performed to every character string to calculate the start point coordinates and sizes ($\Delta x,\Delta y$) of all the characters in the document. However, a block including the start and end points of the scanning range and the start and end points of the original range is not united with neighbor blocks.

In this manner, physical blocks united as one character is called an object again. The characteristic amounts of all the objects calculated by the above method are written in the characteristic amount storage section 4 (see FIG. 1) according to the instruction of the CPU 3a on the basis of an address formed by the characteristic amount access section 3d.

FIG. 13 shows an example wherein the characteristic amounts (the start point coordinates (xs,ys), sizes ($\Delta x,\Delta y$), and the like of the objects) of the objects calculated by the characteristic amount calculation section 3 are stored in the characteristic amount storage section 4.

As shown in FIG. 13, in the characteristic amount storage section 4, the total number n of objects detected by calculating the characteristic amounts of the objects, and the start point coordinates and sizes of the objects serving as the characteristic amounts thereof are stored.

The unnecessary area identifying section 5 will be described below with reference to FIG. 14. This unnecessary area identifying section 5 checks, on the basis of the characteristic amounts of the objects stored in the characteristic amount storage section 4 and the unnecessary area identifying reference information such as unnecessary area information stored in the unnecessary area information storage section 6, whether an object (area) to be processed is an unnecessary area. The unnecessary area identifying section 5 also assigns a process to be performed as an output process.

Figure 14:
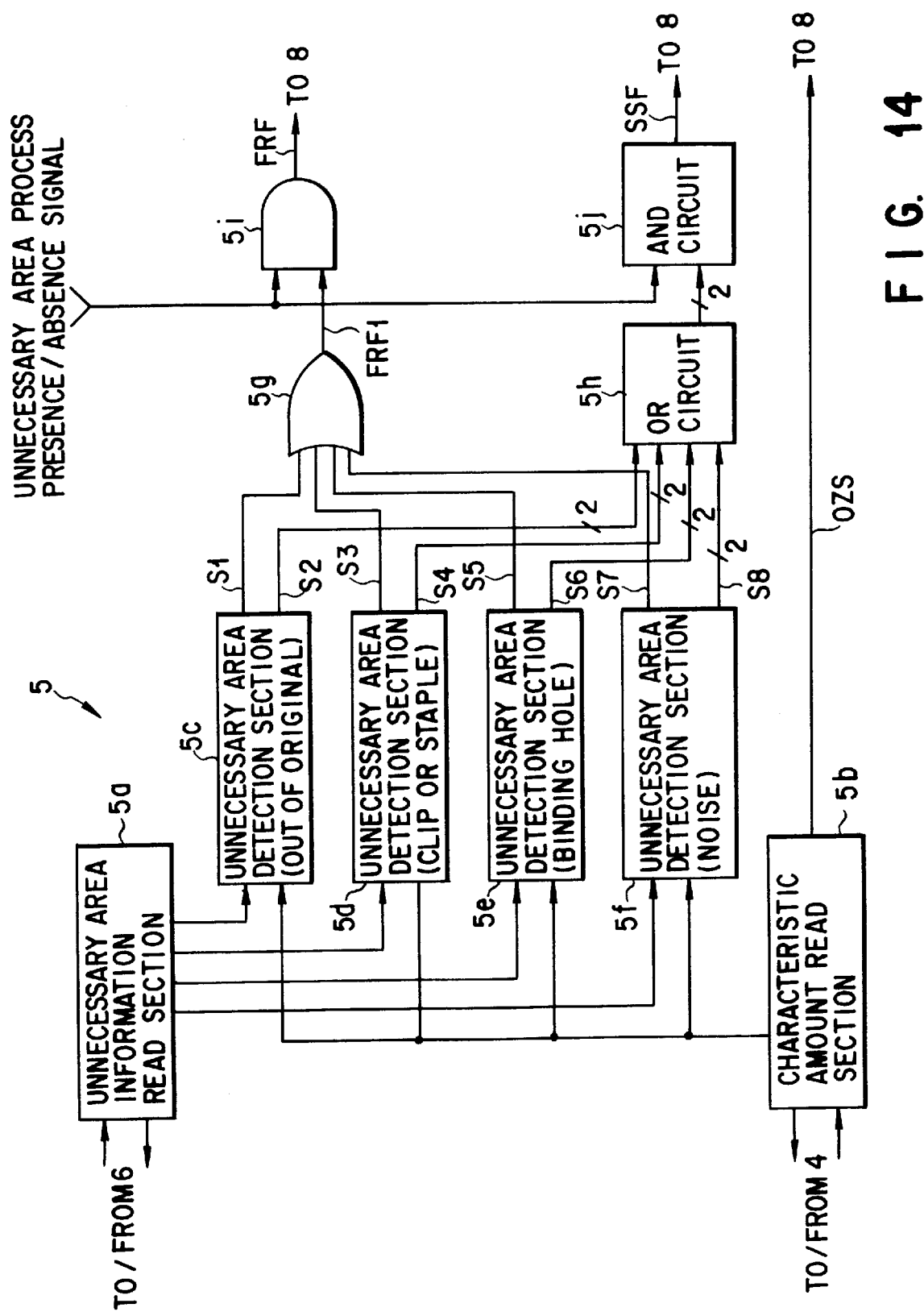
FIG. 14 is a schematic block diagram showing the arrangement of an unnecessary area identifying section in FIG. 1.

The unnecessary area identifying section 5 shown in FIG. 14 has an arrangement for detecting areas, which need not be copied when the image of the original such as a document is to be copied, as, e.g., the outside of an original, the thickness of a book, the shadow or dent of a staple/clip, shadow or dent of a binding hole, a shadow caused by a step formed when an original bound by a staple or the like is reproduced, and small noise.

Referring to FIG. 14, a characteristic amount read section 5b reads the characteristic amounts of a target object from the characteristic amount storage section 4. The read characteristic amounts are output to unnecessary area detection sections 5c to 5f. The start position coordinates (Xs,Ys), size ($\Delta x,\Delta y$), and the like of the read object read as the characteristic amounts of the target object are output to the output processing section 8 (see FIG. 1) as an object position signal OZS.

The unnecessary area detection section 5c detects the outside of the original, the shadow or dent of the thickness of the book, and the like serving as unnecessary areas. The unnecessary area detection section 5d detects the shadow or dent of a staple or clip serving as an unnecessary area. The unnecessary area detection section 5e detects the shadow or dent of binding holes serving as an unnecessary area. The unnecessary area detection section 5f detects an unnecessary area formed by noise or the like generated by influence or the like of a peripheral circuit.

An unnecessary area information read section 5a reads unnecessary area identifying reference information such as unnecessary area information and output process instruction information from the unnecessary area information storage section 6, and supplies these pieces of information to the unnecessary area detection sections 5c to 5f. More specifically, the unnecessary area information read section 5a supplies information related to the unnecessary area of the outside of the original/the thickness of the book, information required to detect the dent and shadow of a staple or clip, information required to detect an unnecessary area such as the shadow or dent of binding holes, and information required to detect an unnecessary area formed by noise or the like to the unnecessary area detection section 5c, the unnecessary area detection section 5d, the unnecessary area detection section 5e, and the unnecessary area detection section 5f, respectively.

Unnecessary area detection signals S1, S3, S5, and S7 and output process instruction signals S2, S4, S6, and S8 for assigning processes to be performed to the unnecessary areas detected by the sections 5c to 5f are output from the unnecessary area detection sections 5c to 5f, respectively. When the target area is an unnecessary area, only one of the unnecessary area detection signals S1, S3, S5, and S7 is set to be "1"; when the target area is a necessary area, all the unnecessary area detection signals S1, S3, S5, and S7 are set to be "0".

The unnecessary area detection signals S1, S3, S5, and S7 are connected to the input terminals of an OR circuit 5g, respectively, and the logical OR of the unnecessary area detection signals S1, S3, S5, and S7 is calculated. An internal unnecessary area signal FRF1 is output from the OR circuit 5g, and the signal FRF1 is connected to one of the input terminals of an AND circuit 5i.

The internal unnecessary area signal FRF1 is set to be "1" only when any unnecessary area is detected from the target object in one of the unnecessary area detection sections 5c to 5f; otherwise, the internal unnecessary area signal FRF1 is set to be "0".

An unnecessary area process presence/absence signal T1 is connected to the other input terminal of the AND circuit 5i. The unnecessary area process presence/absence signal T1 is set to be "1" only when an unnecessary area removing/suppressing function is made valid by an input instruction from the man-machine interface 7 of this apparatus; the unnecessary area process presence/absence signal T1 is set to be "0" when the function is made invalid.

The AND circuit 5i calculates the logical AND between the unnecessary area process presence/absence signal T1 and the internal unnecessary area signal FRF1 to output an unnecessary area detection signal FRF.

The unnecessary area detection signal FRF has a value equal to that of the internal unnecessary area signal FRF1 only when the unnecessary area process presence/absence signal T1 is "1"; otherwise, the unnecessary area detection signal FRF is set to be "0".

Each of the output process instruction signals S2, S4, S6, and S8 is a 2-bit output signal, and is one of four values, e.g., "00" (no process), "01" (object removal), "10" (density adjustment), and "11" (space filtering). One of the output process instruction signals S2, S4, S6, and S8 has one of the values depending on the type, position, and the like of the unnecessary area. When the area is not an unnecessary area, the output process instruction signals S2, S4, S6, and S8 are set to be "00". The output process instruction signals S2, S4, S6, and S8 are input to the OR circuit 5h. The OR circuit 5h calculates the logical OR of the low-order bits of the output process instruction signals S2, S4, S6, and S8 and the logical OR of the high-order bits of the output process instruction signals S2, S4, S6, and S8. The logical AND between an output from the OR circuit 5h and the unnecessary area process presence/absence signal T1 is calculated by the AND circuit 5j, thereby obtaining an output process instruction signal SSF for a target object to be processed.

As described above, when the unnecessary area process presence/absence signal T1 is set to be "1", and the unnecessary area process is set to be valid, the unnecessary area identifying section 5 outputs, as the unnecessary area detection signal FRF ("1": unnecessary area), a result obtained by checking whether each object is an unnecessary area. The unnecessary area identifying section 5 also outputs the output process instruction signal SSF corresponding to the detected unnecessary area.

Although four processes, i.e., "no process", "object removal", "density adjustment", and "space filtering" as output processes are used as the output processes in this embodiment, other processes and combinations thereof may be used. The number of bits of the output process instruction signal may be increased accordingly.

Concrete examples of the arrangements of the unnecessary area detection sections 5c to 5f will be described below.

The unnecessary area detection section 5c detects the outside of an original or the shadow of the thickness of a book. The concrete example of the arrangement of the unnecessary area detection section 5c will be described below with reference to FIG. 15.

As described above, the start point coordinates (Xs,Ys) of an object subjected to unnecessary area detection and the size ($\Delta$x,$\Delta$y) of the object are input from the characteristic amount storage section 4 to the unnecessary area detection section 5c through the characteristic amount read section 5b.

The read range (X0=0, Y0=0) to (Xm,Ym) of the scanner, and the output process instruction signal GSS corresponding to the read range are input from the unnecessary area information storage section 6 to the unnecessary area detection section 5c through the unnecessary area information read section 5a as information required to detect the outside of the original or the like. Conditions used for determining a target object as the outside of an original are described below:

| | |
|---|---:|
| $Xs=X0$, $Ys=Y0$ and $\Delta x=Xm$ | First condition |
| $Xs=X0$, $Ys=Y0$ and $\Delta y=Ym$ | Second condition |
| $Xs=X0$, $Ys+\Delta y=Ym$ and $\Delta x=Xm$ | Third condition |
| $Xs+\Delta x=Xm$, $Ys=Y0$ and $\Delta y=Ym$ | Fourth condition |

When any one of the four conditions is satisfied, the object is determined as the outside of an original or the thickness of a book. A concrete example of the arrangement for performing this is shown in FIG. 15.

In each of the above conditions, it must be checked whether the left-hand side is equal to the right-hand side. However, in this embodiment, in order to absorb an error to some extent, the following operation is performed. That is, the difference between the left-hand side and the right-hand side is calculated, the difference is compared with a threshold value $\Delta$E. When the difference is equal to or smaller than the threshold value $\Delta$E, it is determined that the left-hand side is equal to the right-hand side; when the difference is larger than the threshold value $\Delta$E, it is determined that the left-hand side is not equal to the right-hand side. When any one of the above four conditions is satisfied, it is determined that the outside of the original is determined, and the unnecessary area detection signal S1 is set to be "1"; otherwise, the unnecessary area detection signal S1 is set to be "0".

Figure 15:
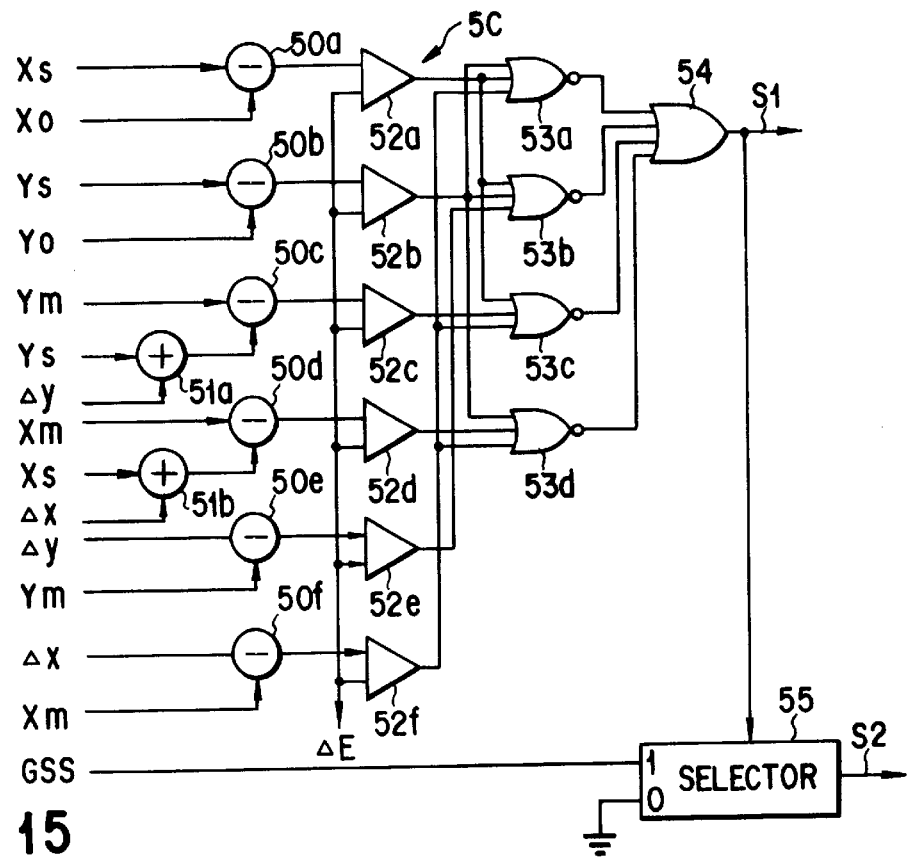
FIG. 15 is a view showing a concrete example of the arrangement of an unnecessary area detection section 5c in FIG. 14.

Referring to FIG. 15, an x-coordinate Xs of the start point position of a target object to be processed and an x-coordinate X0 of the start point position of a scanner read range are input to a subtraction circuit 50a, and the difference between the x-coordinate Xs and the x-coordinate X0 is output from the subtraction circuit 50a and input to one input terminal of a comparison circuit 52a. The threshold value $\Delta$E is input to the other input terminal of the comparison circuit 52a. Only when an output from the subtraction circuit 50a is smaller than the threshold value ΔE, "0" is output from the comparison circuit 52a; when the output from the subtraction circuit 50a is larger than the threshold value ΔE, "1" is output from the comparison circuit 52a. Therefore, when Xs=X0, the output from the comparison circuit 52a is set to be "0"; otherwise, the output from the comparison circuit 52a is set to be "1".

A y-coordinate Ys of the start point position of the target object and a y-coordinate Y0 of the start point position of the scanner read range are input to a subtraction circuit 50b, and the difference between the y-coordinate Ys and the y-coordinate Y0 is output from the subtraction circuit 50b and input to one input terminal of a comparison circuit 52b. The threshold value ΔE is input to the other input terminal of the comparison circuit 52b. Only when an output from the subtraction circuit 50b is smaller than the threshold value ΔE, "0" is output from the comparison circuit 52b; when the output from the subtraction circuit 50a is larger than the threshold value ΔE, "1" is output from the comparison circuit 52b. Therefore, when Ys=Y0, the output from the comparison circuit 52b is set to be "0"; otherwise, the output from the comparison circuit 52b is set to be "1".

The y-coordinate Ys of the start point position of the target object and a y-direction size Δy of the object are input to an addition circuit 51a, and the addition value (Ys+Δy) is output to a subtraction circuit 50c. A y-coordinate Ym of the end point of the scanner read range is input to the subtraction circuit 50c, and the difference between the addition value (Ys+Δy) and Ym is input to one input terminal of a comparison circuit 52c. The threshold value ΔE is input to the other input terminal of the comparison circuit 52c. Only when an output from the subtraction circuit 50c is smaller than the threshold value ΔE, "0" is output from the comparison circuit 52c; when the output from the subtraction circuit 50c is larger than the threshold value ΔE, "1" is output from the comparison circuit 52c. Therefore, when Ys+Δy=Ym, the output from the comparison circuit 52c is set to be "0"; otherwise, the output from the comparison circuit 52c is set to be "1".

The x-coordinate Xs of the start point position of the target object and an x-direction size Δx of the object are input to an addition circuit 51b, and the addition value (Xs+Δx) is output to a subtraction circuit 50d. An x-coordinate Xm of the end point of the scanner read range is input to the subtraction circuit 50d, and the difference between the addition value (Xs+Δx) and Xm is input to one input terminal of a comparison circuit 52d. The threshold value ΔE is input to the other input terminal of the comparison circuit 52d. Only when an output from the subtraction circuit 50d is smaller than the threshold value ΔE, "0" is output from the comparison circuit 52d; when the output from the subtraction circuit 50d is larger than the threshold value ΔE, "1" is output from the comparison circuit 52d. Therefore, when Xs+Δx=Xm, the output from the comparison circuit 52d is set to be "0"; otherwise, the output from the comparison circuit 52d is set to be "1".

The y-direction size Δy of the target object and the y-coordinate Ym of the end point position of the scanner read range are input to a subtraction circuit 50e, and the difference between the size Δy and the y-coordinate Ym is output from the subtraction circuit 50e and input to one input terminal of a comparison circuit 52e. The threshold value ΔE is input to the other input terminal of the comparison circuit 52e. Only when an output from the subtraction circuit 50e is smaller than the threshold value ΔE, "0" is output from the comparison circuit 52e; when the output from the subtraction circuit 50e is larger than the threshold value ΔE, "1" is output from the comparison circuit 52e. Therefore, when Δy=Ym, the output from the comparison circuit 52e is set to be "0"; otherwise, the output from the comparison circuit 52e is set to be "1".

The x-direction size Δx of the target object and the x-coordinate Xm of the end point position of the scanner read range are input to a subtraction circuit 50f, and the difference between the size Δx and the x-coordinate Xm is output from the subtraction circuit 50f and input to one input terminal of a comparison circuit 52f. The threshold value ΔE is input to the other input terminal of the comparison circuit 52f. Only when an output from the subtraction circuit 50f is smaller than the threshold value ΔE, "0" is output from the comparison circuit 52f; when the output from the subtraction circuit 50f is larger than the threshold value ΔE, "1" is output from the comparison circuit 52f. Therefore, when Δx=Xm, the output from the comparison circuit 52f is set to be "0"; otherwise, the output from the comparison circuit 52f is set to be "1".

Outputs from the comparison circuits 52a, 52b, and 52f are input to the input terminal of a NOR circuit 53a to calculate an inverted logical OR of the outputs. More specifically, in the NOR circuit 53a, when all the output from the comparison circuits 52a, 52b, and 52f are "0", it is determined that the first condition is satisfied, and "1" is output; otherwise, "0" is output.

Outputs from the comparison circuits 52a, 52b, and 52e are input to the input terminal of a NOR circuit 53b to calculate an inverted logical OR of the outputs. More specifically, in the NOR circuit 53b, when all the output from the comparison circuits 52a, 52b, and 52e are "0", it is determined that the second condition is satisfied, and "1" is output; otherwise, "0" is output.

Outputs from the comparison circuits 52a, 52c, and 52f are input to the input terminal of a NOR circuit 53c to calculate an inverted logical OR of the outputs. More specifically, in the NOR circuit 53c, when all the output from the comparison circuits 52a, 52c, and 52f are "0", it is determined that the third condition is satisfied, and "1" is output; otherwise, "0" is output.

Outputs from the comparison circuits 52b, 52d, and 52e are input to the input terminal of a NOR circuit 53d to calculate an inverted logical OR of the outputs. More specifically, in the NOR circuit 53d, when all the output from the comparison circuits 52b, 52d, and 52e are "0", it is determined that the fourth condition is satisfied, and "1" is output; otherwise, "0" is output.

Outputs from the NOR circuits 53a to 53d are input to the input terminals of an OR circuit 54 to calculate a logical OR of the outputs. As a result, the output terminal of the OR circuit 54 outputs "1" when any one of the NOR circuits 53a to 53d is "1", i.e., when any one of the first through fourth conditions is satisfied. The signal output from the OR circuit 54 is the unnecessary area detection signal S1.

When the unnecessary area detection signal S1 is "1", an output process instruction selector 55 directly outputs the output process instruction signal GSS read from the unnecessary area information storage section 6; otherwise, the output process instruction selector 55 outputs "0" as an output process instruction signal S2.

The unnecessary area detection section 5d will be described below with reference to FIG. 16.

The unnecessary area detection section 5d detects the shadow or dent of a staple, clip, or the like on the basis of the image data of the original. A concrete example of the arrangement of the unnecessary area detection section 5d is shown in FIG. 16.

As described above, the start point coordinates (Xs,Ys) of an object subjected to read unnecessary area detection, the size ($\Delta x, \Delta y$) of the object, coordinates XAS and XAE of the first and last crests which are in the horizontal direction inside the original and are obtained from vertical/horizontal projection information, and coordinates YAS and YAE of the first and last crests in the vertical direction are input from the characteristic amount storage section 4 to the unnecessary area detection section 5d through the characteristic amount read section 5b.

As information required to detect a staple, a clip, and the like, a scanner read range (X0=0, Y0=0) to (Xm,Ym), an original range (X'0, Y'0) to (X'm,Y'm), the maximum size (Lxm,Lym) of the clip, the maximum size (Sxm,Sym) of the staple, and a corresponding output process instruction information CSS are input from the unnecessary area information storage section 6 to the unnecessary area detection section 5d through the unnecessary area information read section 5a.

Conditions used for determining a target object as the clip itself or its shadow or dent are described below:

{Xs=X'0 or (Xs+$\Delta$x)=X'm} and {($\Delta$x<Lxm, $\Delta$y<Lym)} (e.g., Lxm= Xm/10, Lym=Ym/10)    Fifth condition {Ys=Y'0 or (Ys+$\Delta$y)=Y'm} and {$\Delta$x<Lxm, $\Delta$y<Lym)} (e.g., Lxm= Xm/10, Lym=Ym/10)    Sixth condition When any one of the fifth and sixth conditions is satisfied, i.e., when it is determined that the size of an object extending from one side of the four sides of the original in an x or y direction is smaller than the maximum size of the clip, the object is determined as a clip itself or its shadow or dent.

Conditions used for determining a target object as the staple itself or its shadow or dent are described below:

Xs<XAS and ($\Delta$x<Sxm, $\Delta$y<Sym)    Seventh condition

Ys<YAS, and ($\Delta$x<Sxm, $\Delta$y<Sym)    Eighth condition (Xs>XAS, (Xs+$\alpha$x)>XAE) and ($\Delta$x<Sxm, $\Delta$y<Sym)    Ninth condition (Ys>YAS, (Ys+$\Delta$y)>YAE) and ($\Delta$x<Sxm, $\Delta$y<Sym)    Tenth condition When any one of the seventh to tenth conditions is satisfied, i.e., when it is determined that an object is located at the position of a crest of projection closest to one of the four sides of the original and is smaller than the maximum size of the staple, the object is determined as the staple itself or its shadow or dent. A concrete example of the arrangement for performing this is shown in FIG. 16. Note that, in FIG. 16, for the reason described in FIG. 15, a threshold value $\Delta$E is used to check whether the left-hand side is equal to the right-hand side in each of the above conditions.

Figure 16:
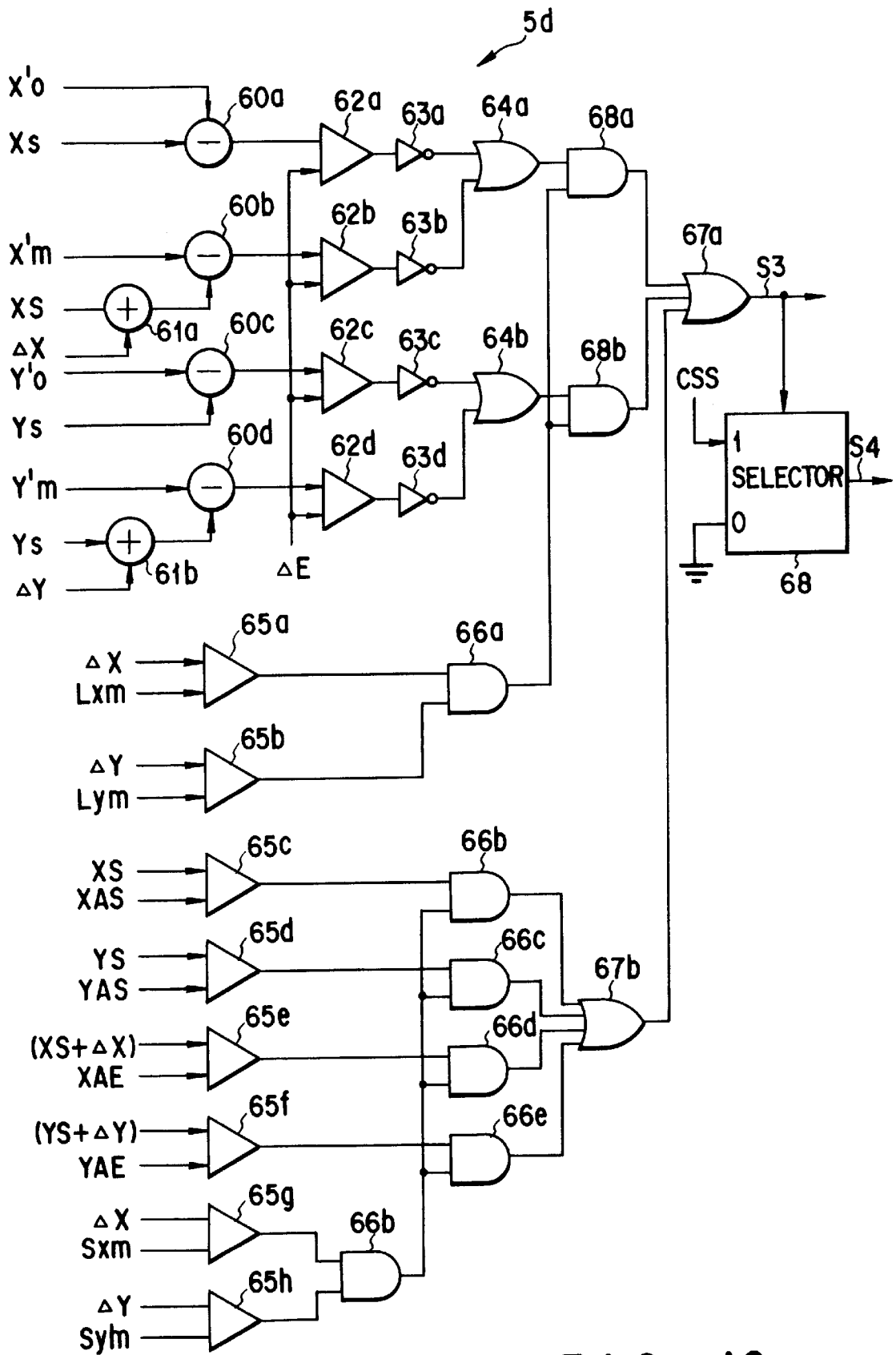
FIG. 16 is a view showing a concrete example of the arrangement of an unnecessary area detection section 5d in FIG. 14.

Referring to FIG. 16, an x-coordinate Xs of the start point position of a target object to be processed and an x-coordinate X'0 of the start point position of an original range are input to a subtraction circuit 60a, and the difference between the x-coordinate Xs and the x-coordinate X'0 is output from the subtraction circuit 60a and input to one input terminal of a comparison circuit 62a. The threshold value $\alpha$E is input to the other input terminal of the comparison circuit 62a. Only when an output from the subtraction circuit 60a is smaller than the threshold value $\Delta$E, "0" is output from the comparison circuit 62a; when the output from the subtraction circuit 60a is larger than the threshold value $\Delta$E, "1" is output from the comparison circuit 62a. Therefore, when Xs=X'0, the output from the comparison circuit 62a is set to be "0"; otherwise, the output from the comparison circuit 62a is set to be "1".

The x-coordinate Xs of the start point position of the target object and an x-direction size $\Delta$x of the object are input to an addition circuit 61a, and the addition value (Xs+$\Delta$x) is output to a subtraction circuit 60b. An x-coordinate X'm of the end point of the original range is input to the subtraction circuit 60b, and the difference between the addition value (Xs+$\Delta$x) and X'm is input to one input terminal of a comparison circuit 62b. The threshold value $\Delta$E is input to the other input terminal of the comparison circuit 62b. Only when an output from the subtraction circuit 60b is smaller than the threshold value $\Delta$E, "0" is output from the comparison circuit 62b; when the output from the subtraction circuit 60b is larger than the threshold value $\Delta$E, "1" is output from the comparison circuit 62b. Therefore, when Xs+$\Delta$x=X'm, the output from the comparison circuit 62b is set to be "0"; otherwise, the output from the comparison circuit 62b is set to be "1".

A y-coordinate Ys of the start point position of the target object and a y-coordinate Y'0 of the start point position of the original range are input to a subtraction circuit 60c, and the difference between the y-coordinate Ys and the y-coordinate Y'0 is output from the subtraction circuit 60c and input to one input terminal of a comparison circuit 62c. The threshold value $\Delta$E is input to the other input terminal of the comparison circuit 62c. Only when an output from the subtraction circuit 60c is smaller than the threshold value $\Delta$E, "0" is output from the comparison circuit 62c; when the output from the subtraction circuit 60c is larger than the threshold value $\Delta$E, "1" is output from the comparison circuit 62c. Therefore, when Ys=Y'0, the output from the comparison circuit 62c is set to be "0"; otherwise, the output from the comparison circuit 62c is set to be "1".

The y-coordinate Ys of the start point position of the target object and a y-direction size $\Delta$y of the object are input to an addition circuit 61b, and the addition value (Ys+$\Delta$y) is output to a subtraction circuit 60d. A y-coordinate Y'm of the end point of the original range is input to the subtraction circuit 60d, and the difference between the addition value (Ys+$\Delta$y) and Y'm is input to one input terminal of a comparison circuit 62d. The threshold value $\Delta$E is input to the other input terminal of the comparison circuit 62d. Only when an output from the subtraction circuit 60d is smaller than the threshold value $\Delta$E, "00" is output from the comparison circuit 62d; when the output from the subtraction circuit 60d is larger than the threshold value $\Delta$E, "1" is output from the comparison circuit 62d. Therefore, when Ys+$\Delta$y=Y'm, the output from the comparison circuit 62d is set to be "0"; otherwise, the output from the comparison circuit 62d is set to be "1".

The x-direction size $\Delta$x of the target object is input to one terminal of a comparison circuit 65a, and the x-direction maximum size Lxm of the clip is input to the other terminal of the comparison circuit 65a, thereby comparing these values with each other. As a result, only when $\Delta$x is smaller than Lxm ($\Delta$x<Lxm), "1" is output from the output terminal of the comparison circuit 65a; when $\Delta$x is larger than Lxm ($\Delta$x>Lxm), "0" is output from the comparison circuit 65a.

The y-direction size $\Delta$y of the target object is input to one terminal of a comparison circuit 65b, and the y-direction maximum size Lym of the clip is input to the other terminal of the comparison circuit 65b, thereby comparing these values with each other. As a result, only when $\Delta$y is smaller than Lym ($\Delta$y<Lym), "1" is output from the output terminal of the comparison circuit 65b; when $\Delta$y is larger than Lxm ($\Delta$y>Lym), "0" is output from the comparison circuit 65b.

Outputs from the comparison circuits 62a and 62b are logically inverted by inverter circuits 63a and 63b, respectively, and then input to an OR circuit 64a. Therefore, any one of conditional expressions: Xs=X'0 and (Xs+Δx)–X'm is satisfied, "1" is output from the output terminal of the OR circuit 64a.

Outputs from the comparison circuits 62c and 62d are logically inverted by inverter circuits 63c and 63d, respectively, and then input to an OR circuit 64b. Therefore, any one of conditional expressions: Ys=Y'0 and (Ys+Δy)–Y'm is satisfied, "1" is output from the output terminal of the OR circuit 64b.

Outputs from the comparison circuits 65a and 65b are input to an AND circuit 66a. Therefore, when Δx<Lxm and Δy<Lym, "1" is output from the output terminal of the AND circuit 66a.

An output from the OR circuit 64a and an output from the AND circuit 66a are input to an AND circuit 68a. Therefore, only when the fifth condition is satisfied, "1" is output from the output terminal of the AND circuit 68a, and the object is determined as a clip itself extending from one side of the four sides of the original in the x direction within the maximum size of the clip or the shadow or dent of the clip.

An output from the OR circuit 64b and an output from the AND circuit 66a are input to an AND circuit 68b. Therefore, only when the sixth condition is satisfied, "1" is output from the output terminal of the AND circuit 68b, and the object is determined as a clip itself extending from one side of the four sides of the original in the y direction within the maximum size of the clip or the shadow or dent of the clip.

The x-direction start point coordinate Xs of the target object is input to one input terminal of a comparison circuit 65c, and the coordinate XAS of the first crest which is in the horizontal direction inside the original is input to the other input terminal of the comparison circuit 65c, thereby comparing these values with each other. As a result, only when Xs is smaller than XAS (Xs<XAS), "1" is output from the output terminal of the comparison circuit 65c; when Xs is larger than XAS (Xs>XAS), "0" is output from the output terminal of the comparison circuit 65c.

The y-direction start point coordinate Ys of the target object is input to one input terminal of a comparison circuit 65d, and the coordinate YAS of the first crest which is in the vertical direction inside the original is input to the other input terminal of the comparison circuit 65d, thereby comparing these values with each other. As a result, only when Ys is smaller than YAS (Ys<YAS), "1" is output from the output terminal of the comparison circuit 65d; when Ys is larger than YAS (Ys>YAS), "0" is output from the output terminal of the comparison circuit 65d.

The addition value (Xs+Δx) output from the addition circuit 61a is input to one input terminal of a comparison circuit 65e, a coordinate XAE of the last crest which is in the horizontal direction inside the original is input to the other input terminal of the comparison circuit 65e, thereby comparing these value with each other. As a result, when the addition value (Xs+Δx) is larger than XAS ((Xs+Δx)>XAS), "1" is output from the output terminal of the comparison circuit 65e; when the addition value is smaller than XAS, "0" is output from the output terminal of the comparison circuit 65e.

The addition value (Ys+Δy) output from the addition circuit 61b is input to one input terminal of a comparison circuit 65f, a coordinate YAE of the last crest which is in the horizontal direction inside the original is input to the other input terminal of the comparison circuit 65f, thereby comparing these value with each other. As a result, when the addition value (Ys+Δy) is larger than YAS ((Ys+Δy)>YAS), "1" is output from the output terminal of the comparison circuit 65f; when the addition value is smaller than YAS, "0" is output from the output terminal of the comparison circuit 65f.

The x-direction size Δx of the target object is input to one input terminal of a comparison circuit 65g, and an x-direction maximum size Sxm of a staple is input to the other input terminal of the comparison circuit 65g, thereby comparing these values with each other. As a result, when Δx is smaller than Sxm (Δx<Sxm), "1" is output from the output terminal of the comparison circuit 65g; when Δx is larger than Sxm, "0" is output from the output terminal of the comparison circuit 65g.

The y-direction size Δy of the target object is input to one input terminal of a comparison circuit 65h, and an y-direction maximum size Sym of the staple is input to the other input terminal of the comparison circuit 65h, thereby comparing these values with each other. As a result, when Δy is smaller than Sym (Δy<Sym), "1" is output from the output terminal of the comparison circuit 65h; when Δy is larger than Sym, "0" is output from the output terminal of the comparison circuit 65h.

Outputs from the comparison circuits 65g and 65h are input to an AND circuit 66b. Therefore, when Δx<Sxm and Δy<Sym are satisfied, an output from the AND circuit 66b is set to be "1".

The output from the AND circuit 66b is input to one input terminal of each of AND circuits 66b, 66c, 66d, and 66e.

Outputs from the comparison circuits 65c, 65d, 65e, and 65f are input to the other input terminals of the AND circuits 66b, 66c, 66d, and 66e, respectively. Therefore, "1" is output from the AND circuit 66b when the seventh condition is satisfied, "1" is output from the AND circuit 66c when the eighth condition is satisfied, "1" is output from the AND circuit 66d when the ninth condition is satisfied, and "1" is output from the AND circuit 66e when the tenth condition is satisfied.

Outputs from the AND circuits 66b, 66c, 66d, and 66e are input to the OR circuit 67b. Therefore, any one of the seventh to tenth conditions is satisfied, "1" is output from the output terminal of the OR circuit 67b, and the object is determined as a staple itself or its shadow or dent.

An output from the AND circuit 66b and an output from the OR circuit 67b are input to an OR circuit 67a. The logical OR between these outputs is calculated by the OR circuit 67a, and an unnecessary area detection signal S3 is output from the OR circuit 67a. That is, when the target object is determined as a clip, a staple, or the shadow or dent thereof, the unnecessary area detection signal S3 is set to be "1".

When the unnecessary area detection signal S3 is "1", an output process instruction selector 68 directly outputs the output process instruction information CSS read from the unnecessary area information storage section 6; otherwise, the output process instruction selector 68 outputs "0" as an output process instruction signal S4.

The unnecessary area detection section 5e will be described below with reference to FIG. 17.

The unnecessary area detection section 5e detects the shadow or dent of binding holes. A concrete example of the arrangement of the unnecessary area detection section 5e is shown in FIG. 17.

As described above, the start point coordinates (Xs,Ys) of an object subjected to unnecessary area detection and the size (Δx,Δy) of the object which are read from the characteristic amount storage section 4 through the characteristic amount read section 5b are input to the unnecessary area detection section 5c. The binding hole start point coordinates (XTS,YTs), the number TN of binding holes, the distance (DTx,DTy) between the binding holes, the size (ΔDx,ΔDy) of each binding hole, and output process instruction information TSS in the binding hole area are input, as unnecessary area identifying reference information, from the unnecessary area information storage section 6 to the unnecessary area detection section 5e through the unnecessary area information read section 5a.

In the unnecessary area detection section 5e, it is checked whether the start point coordinates (Xs,Ys) of each object coincide with the start point coordinates (XTs, YTs) of the binding hole and whether the size (ΔDx,ΔDy) of each binding hole is equal to the size (Δx,Δy) of the object. If both the conditions are satisfied, the unnecessary area detection section 5e outputs an unnecessary area detection signal S5 such that the unnecessary area detection signal S5 is set to be "1"; otherwise, the unnecessary area detection section 5e outputs the unnecessary area detection signal S5 such that the unnecessary area detection signal S5 is set to be "0".

Figure 17:
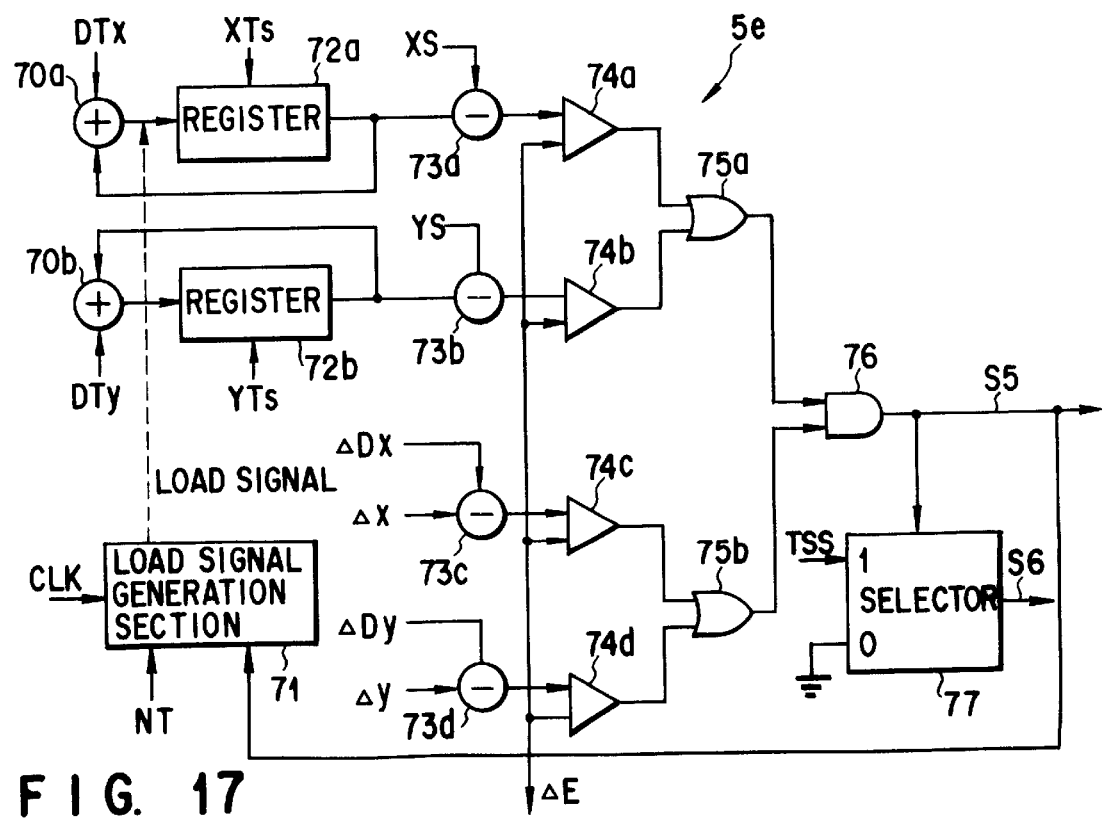
FIG. 17 is a view showing a concrete example of the arrangement of an unnecessary area detection section 5e in FIG. 14.

Referring to FIG. 17, comparison circuits 74a to 74d checks whether the start point coordinates (Xs,Ys) of each object coincide with the start point coordinates (XTs, YTs) of the binding hole and whether the size (ΔDx,ΔDy) of each binding hole is equal to the size (Δx,Δy) of the object. For this purpose, in order to absorb an error range to some extent, the differences is compared with a threshold value ΔE. Only when each of the differences is smaller than the error ΔE, outputs from the comparison circuits 74a to 74d are set to be "1".

The x-direction start point coordinate XTs of the binding hole is temporarily stored in a register circuit 72a. The register circuit 72a outputs the stored x-direction start point coordinate XTs of the binding hole to a subtraction circuit 73a and an addition circuit 70a.

The x-direction distance DTx between the binding holes is input to the addition circuit 70a, and the distance DTx is added to the x-direction start point coordinate XTs of the binding hole. Each time one binding hole area is detected, at the timing of rising of a load signal output from a load signal generation section 71, the x-direction start point coordinate XTs (addition result) of the next binding hole, i.e., $$XTs=XTs+DTx$$

is written in the register circuit 72a. At this time, the x-direction start point coordinate XTs of the binding hole from the addition circuit 70a is temporarily stored in the register circuit 72a, and, at the same time, is output to the subtraction circuit 73a and the addition circuit 70a.

Similarly, the y-direction start point coordinate YTs of the binding hole is temporarily stored in a register circuit 72b. The register circuit 72b outputs the stored y-direction start point coordinate YTs of the binding hole to a subtraction circuit 73b and an addition circuit 70b.

The y-direction distance DTy between the binding holes is input to the addition circuit 70b, and the distance DTy is added to the y-direction start point coordinate YTs of the binding hole. Each time one binding hole area is detected, at the timing of rising of a load signal output from the load signal generation section 71, the y-direction start point coordinate YTs (addition result) of the next binding hole, i.e., $$YTs=YTs+DTy$$

is written in the register circuit 72b. At this time, the y-direction start point coordinate YTs of the binding hole from the addition circuit 70b is temporarily stored in the register circuit 72b, and, at the same time, is output to the subtraction circuit 73b and the addition circuit 70b.

In this manner, at the start of binding hole detection, and each time one binding hole area is detected, the register circuit 72a outputs the start point coordinates of the next hole serving as a reference.

An x-direction start point coordinate Xs of an object subjected to detection is input to the subtraction circuit 73a. The subtraction circuit 73a calculates the difference between the x-direction start point coordinate Xs and the x-direction start point coordinate of the binding hole output from the register circuit 72a and serving as a reference and inputs the resultant difference to one input terminal of the comparison circuit 74a.

The threshold value ΔE is input to the other input terminal of the comparison circuit 74a. Only when an output from the subtraction circuit 73a is smaller than the threshold value ΔE, "1" is output from the subtraction circuit 74a; when the output from the subtraction circuit 73a is larger than the threshold value ΔE, "0" is output from the comparison circuit 74a. Therefore, when Xs=XTs, an output from the comparison circuit 74a is set to be "1"; otherwise, the output from the comparison circuit 74a is set be "0".

An y-direction start point coordinate Ys of an object subjected to detection is input to the subtraction circuit 73b. The subtraction circuit 73b calculates the difference between the y-direction start point coordinate Ys and the y-direction start point coordinate of the binding hole output from the register circuit 72b and serving as a reference and inputs the resultant difference to one input terminal of the comparison circuit 74b.

The threshold value ΔE is input to the other input terminal of the comparison circuit 74b. Only when an output from the subtraction circuit 73b is smaller than the threshold value ΔE, "1" is output from the subtraction circuit 74b; when the output from the subtraction circuit 73b is larger than the threshold value ΔE, "0" is output from the comparison circuit 74b. Therefore, when Ys =YTs, an output from the comparison circuit 74b is set to be "1"; otherwise, the output from the comparison circuit 74b is set be "0".

Outputs from the comparison circuits 74a and 74b are input to an OR circuit 75a, the logical OR between the outputs is input to one input terminal of an AND circuit 76.

The x-direction size Δx of the object subjected to detection and the size ΔDx of the binding hole serving as a reference are input to a subtraction circuit 73c, and the difference therebetween is input to one input terminal of a comparison circuit 74c.

The threshold value ΔE is input to the other input terminal of the comparison circuit 74c. Only when an output from the subtraction circuit 73c is smaller than the threshold value ΔE, "1" is output from the subtraction circuit 74c; when the output from the subtraction circuit 73c is larger than the threshold value ΔE, "0" is output from the comparison circuit 74c. Therefore, when Δx=ΔDx, an output from the comparison circuit 74c is set to be "11"; otherwise, the output from the comparison circuit 74c is set be "0".

The y-direction size Δy of the object subjected to detection and the size ΔDy of the binding hole serving as a reference are input to a subtraction circuit 73d, and the difference therebetween is input to one input terminal of a comparison circuit 74d.

The threshold value ΔE is input to the other input terminal of the comparison circuit 74d. Only when an output from the subtraction circuit 73d is smaller than the threshold value ΔE, "1" is output from the subtraction circuit 74d; when the output from the subtraction circuit 73d is larger than the threshold value ΔE, "0" is output from the comparison circuit 74d. Therefore, when Δy=ΔDy, an output from the comparison circuit 74d is set to be "1"; otherwise, the output from the comparison circuit 74d is set be "0".

Outputs from the comparison circuits 74c and 74d are input to an OR circuit 75b, and the logical OR therebetween is input to the other input terminal of the AND circuit 76.

The AND circuit 76 calculates the logical AND between the outputs from the OR circuit 75a and an OR circuit 75b, and outputs the unnecessary area detection signal S5 as a result. The unnecessary area detection signal S5 is set to be "1" when both the outputs from the OR circuits 75a and 75b are "1". More specifically, when the x-direction coordinate Xs of the object subjected to detection coincides with the x-direction start point coordinate XTs of the binding hole serving as a reference, and the x-direction size Δx of the object is equal to the x-direction size of the binding hole, the object is determined as the shadows or the like of binding holes which are arranged along the x-direction side of the original. When the y-direction coordinate Ys of the object subjected to detection coincides with the y-direction start point coordinate YTs of the binding hole serving as a reference, and the y-direction size Δy of the object is equal to the y-direction size of the binding hole, the object is determined as the shadows or the like of binding holes which are arranged along the y-direction side of the original. The unnecessary area detection signal S5 is set to be "1", and the shadow or the like of the binding holes is detected.

The unnecessary area detection signal S5 is input to the load signal generation section 71. In addition, the number TN of binding holes is input to the unnecessary area detection signal S5 at the start of a detection process in the unnecessary area detection section 5e is input to the load signal generation section 71, and the value is temporarily stored in the load signal generation section 71. The load signal generation section 71 has a counter which is incremented by 1 each time the unnecessary area detection signal S5 is set to be "1". When the counter is incremented by 1, and the count value is smaller than the number NT of holes, the load signal generation section 71 outputs a load signal as "1". At the timing of the load signal, the start point coordinates (XTs,YTs) of the binding hole serving as a reference are written in the register circuit 72a.

When the unnecessary area detection signal S5 is "1", an output process instruction selector 77 directly outputs the output process instruction information TSS read from the unnecessary area information storage section 6; otherwise, the output process instruction selector 77 outputs "0" as the output process instruction signal S6.

Figure 18:
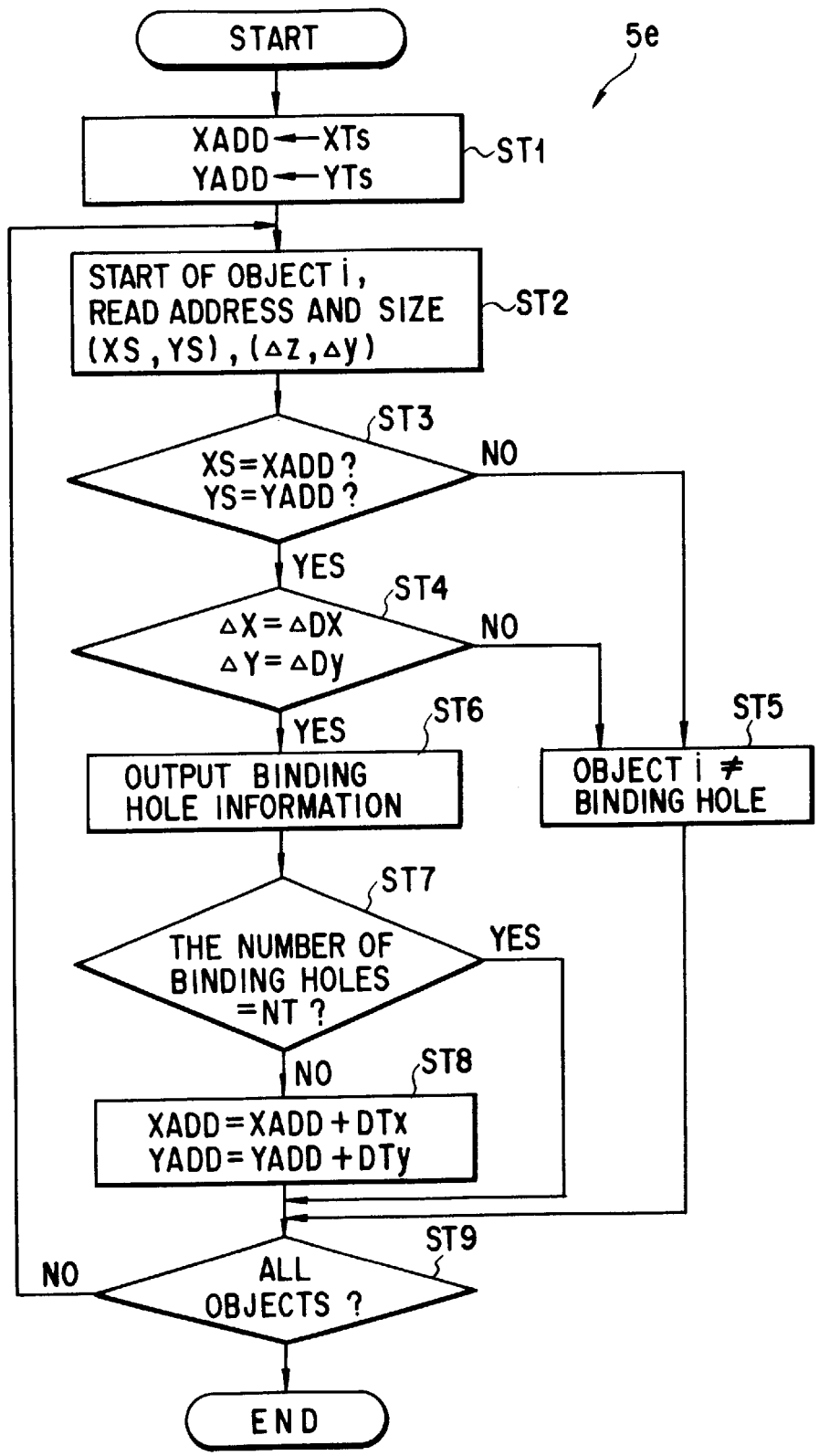
FIG. 18 is a flow chart for explaining a binding hole detecting process.

The detection process in the unnecessary area detection section 5e is not limited to the process performed by the hardware shown in FIG. 17. The detection process can also be performed by software. The case wherein the detection process is performed by software will be described below with reference to the flow chart shown in FIG. 18.

In step ST1, as binding hole start point coordinates (xADD,yADD) serving as a reference required to detect a binding hole, binding hole start point coordinates (Xts,YTs) read from the unnecessary area information storage section 6 as unnecessary area identifying reference information are set. That is, xADD=XTS and yADD=YTs are set. In addition, the size (ΔDx,JDy) of a binding hole, the number TN of binding holes, and distances (DTx,DTy) between the binding holes are read from the unnecessary area information storage section 6 as the unnecessary area identifying reference information.

The flow shifts to step ST2. In step ST2, the start point coordinates (Xs,Ys) of the object subjected to unnecessary area detection and the sizes (Δx,Δy) are read from the characteristic amount storage section 4. The flow shifts to step ST3.

In step ST3, the start point coordinates (Xs,Ys) of the object subjected to detection are compared with the binding hole start point coordinates (xADD,yADD) serving as a reference to check whether the start points coordinates (Xs,Ys) coincide with the binding hole start point coordinates (xADD,yADD). If YES in step ST3, the flow shifts to step ST4. If NO in step ST3, the flow shifts to step ST5, and it is determined that the object is not a binding hole.

In step ST4, the sizes (Δx,Δy) of the object subjected to detection are compared with the sizes (ΔDx,ΔDy) of the binding hole serving as a reference to check whether the sizes (Δx,Δy) coincide with the sizes (ΔDx,ΔDy). If YES in step S4, the flow shifts to step ST6. If NO in step S4, the flow shifts to step ST5, and it is determined that the object is not a binding hole.

In step ST6, it is determined that a binding hole area is detected, and, for example, the unnecessary area detection signal S5 is output.

The flow shifts to step ST7. In step ST7, each time a binding hole area is detected in step ST6, the binding hole area is counted. When the count value is smaller than the number TN of binding holes, the flow shifts to step ST8. When the count value is equal to the number TN of binding holes, the flow shifts to step ST9, and the processes in steps ST2 to ST8 are performed to all other objects.

In step ST8, the binding hole start point coordinates (xADD,yADD) serving as a reference are updated. More specifically, XADD=XTs+DTx and yADD=YTs+DTy, the start point coordinates (xADD,yADD) of a binding hole located next are set, and the flow shifts to step ST9.

According to the processing procedures described above, a detection process result similar to that obtained in the case described in FIG. 17 can be obtained.

The unnecessary area detection section 5f will be described below with reference to FIG. 19.

The unnecessary area detection section 5f detects small noise generated when an original is read to detect an object. A concrete example of the unnecessary area detection section 5f is shown in FIG. 19.

As described above, the start point coordinates (Xs,Ys) of the subjected to unnecessary area detection and the size (Δx,Δy) of the object which are read from the characteristic amount storage section 4 through the characteristic amount read section 5b are input to the unnecessary area detection section 5f. In addition, the maximum sizes (ΔNx,ΔNy) of noise serving as a reference and output process instruction information NSS corresponding to the maximum sizes are input, as unnecessary area identifying reference information, from the unnecessary area information storage section 6 to the unnecessary area detection section 5e through the unnecessary area information read section 5a.

Figure 19:
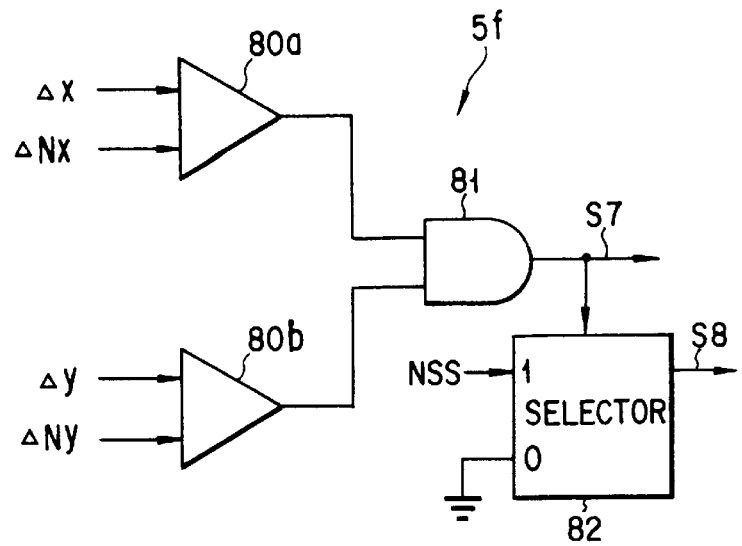
FIG. 19 is a concrete example of the arrangement of an unnecessary area detection section 5f in FIG. 14.

Referring to FIG. 19, the x-direction maximum size ΔNx of the noise serving as a reference is input to one input terminal of a comparison circuit 80a, and the x-direction size Δx of the object subjected to detection is input to the other input terminal of the comparison circuit 80a, thereby comparing these values with each other. When the x-direction size Δx of the object is larger than the x-direction maximum size ΔNx, "1" is output from the output terminal of the comparison circuit 80a; when the x-direction size Δx of the object is smaller than the x-direction maximum size ΔNx, "0" is output from the output terminal of the comparison circuit 80a.

The y-direction maximum size ΔNy of the noise serving as a reference is input to one input terminal of a comparison circuit 80b, and the y-direction size Δy of the object subjected to detection is input to the other input terminal of the comparison circuit 80b, thereby comparing these values with each other. When the y-direction size Δy of the object is larger than the y-direction maximum size ΔNy, "1" is output from the output terminal of the comparison circuit 80b; when the y-direction size Δy of the object is smaller than the y-direction maximum size ΔNy, "0" is output from the output terminal of the comparison circuit 80b.

Outputs from the comparison circuits 80a and 80b are input to an AND circuit 81, and the logical AND therebetween is output from the output terminal of the AND circuit 81 as the unnecessary area detection signal S7. More specifically, only when both the x- and y-direction coordinates (or sizes) of the target object are larger than the noise maximum size (ΔNx,ΔNy), the unnecessary area detection signal S7 is set to be "1". At this time, it is determined that noise is detected at the x- and y-direction coordinates (or sizes) of the target object.

When the unnecessary area detection signal S7 is "1", an output process instruction selector 82 directly outputs the output process instruction information NSS (e.g., filtering) read from the unnecessary area information storage section 6; otherwise the output process instruction selector 82 outputs "0" (no process) as the output process instruction signal S8.

The output processing section 8 will be described below with reference to FIG. 20.

FIG. 20 schematically shows the arrangement of the output processing section 8. An object position signal OZS (start addresses Xs and Ys and sizes Δx and Δy serving as the characteristic amounts of the target object to be processed) is input from the unnecessary area identifying section 5 to a control circuit 9a. The control circuit 9a assigns an address (address in unit of pixel) to the image storage section 2 on the basis of the information from the unnecessary area identifying section 5, and reads an original image corresponding to the target object from the image storage section 2 in units of pixels. The original image is input from the image storage section 2 to the output processing section 8 as image data IID. Generation of read timing from the image storage section 2 or control of the overall control circuit 9a are performed by using dedicated CPUs.

The image data IID from the image storage section 2 is input to one of the four data input terminal of a selector circuit 9g, a density adjustment section 9b, and a filter 9c.

For example the density adjustment section 9b uses an LUT (Look-Up Table) scheme and, as an address, a pixel input as the image data IID, and outputs pixel data having a density stored in advance in accordance with the address as image data having a density which is adjusted. The image data having a density which is adjusted is input to another one of the four data input terminals of the selector circuit 9g.

Figure 21:
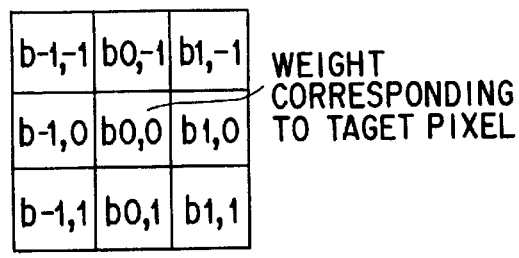
FIG. 21 is a view for explaining a density adjusting process in a density adjustment section in FIG. 20.

In this case, the density adjustment section 9b will be described below with reference to FIG. 21. FIG. 21 shows a storage example of the LUT (Look-Up Table).

It is assumed that the pixel value of a pixel read from the image storage section 2 is, e.g., 8 bits per pixel. When this is used as the address of the LUT (Look-Up Table), 256 addresses are available, a 256-byte memory is used to store data which is predetermined in accordance with each address. When the data is read, and the data is used as the pixel value of the pixel, density adjustment can be performed.

The filtering section 9c performs a filtering process to the image data IID and outputs image data obtained as the result to still another one of the four data input terminals of the selector circuit 9g. The filtering process in this case is as follows. For example, when the pixel value of a neighbor pixel is defined as a sample, the pixel value corresponding to a statistic mount (e.g., the average value of a pixel value in a neighbor area) is output to smooth the pixel value.

An address generation means 9e generates, on the basis of the address of the target object output from the control circuit 9a, the address of the pixel subjected to the filtering process by the filtering section 9c in accordance with the size of a filter, and the address is input to one data input terminal of the selector circuit 9g.

In this case, the filtering section 9c will be described below with reference to FIGS. 22A and 22B.

Figures 22A, 22B:
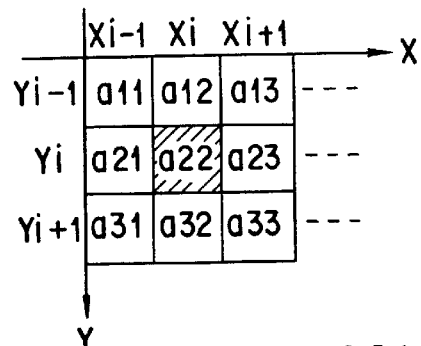
FIGS. 22A and 22B are views for explaining a process in a filtering section in FIG. 20.

Weight shown in FIG. 22A are used to calculate the filtered, output of a pixel ai,j, where ai,j represents jth pixel of ith scan. The filtered output a'i,j of ai,j can be represented by equation (5).

$$a'i, j = \sum_{k=-1}^{1} \sum_{i=-1}^{1} b_{ki} a(i-k)(j-i) \qquad (5)$$

In order to perform the above filtering, line buffers are used to store the values of previous scans. That filtered output of aij can be obtained only when the pixel ai+1, j+1 is input and hence that is a delay of one line and one pixel between the input and output when a filter of FIG. 22A is used. Therefore, the address output has to be changed accordingly, that is, the address output has to be delayed by one line and one pixel, and hence the address output is (i−1, j−1) when the input address is (i,j).

In order to actually perform the above process, as shown in FIG. 20, a line buffer 9d is used.

The line buffer 9d temporarily stores a pixel input as the image data IID, and causes the filtering section 9c to perform the process expressed by equation (5) on the basis of the pixel value stored in the density adjustment section 9b. More specifically, in a case shown in FIG. 22B, when filtering is to be performed to the pixel a22, one line and one pixel are input to the line buffer 9d, as mentioned above, after the pixel a22 is input to the line buffer 9d.

In the filtering, an address must be generated in accordance with vertical/horizontal image delay. For example, when the filter having the size (3×3) shown in FIG. 22B is used, in order to perform the filtering process to the pixel a22 as indicated in equation (5), after the pixel is input to the line buffer 9d, one line and one pixel are required. Therefore, when the pixel a11 is input to the line buffer 9d, the actual address is the address of the pixel a11. For this reason, an error occurs between the address of the target pixel a22 and the address of the pixel a11. In order to generate the address of the target pixel a22, when a description is performed on the basis of the state stored in the line buffer 9d, the pixel address must be vertically and horizontally shifted by one. More specifically, when an address on the process when the target pixel a22 is stored in the line buffer 9d is (Xi,Yi), the actual address corresponds to (Xi−1, Yi−1), as mentioned above.

When "removal" of the target object is assigned as an output process, the data input terminal 01 of the selector circuit 9g is grounded to set the pixel value of the object to be "0".

The unnecessary area detection signal FRF and the output process instruction signal SSF are input from the unnecessary area identifying section 5 to a select signal generation section 9f. The select signal generation section 9f generates, on the basis of these signals, an image select signal S10 (e.g., 2-bit signal) to be output to the selector circuits 9g and 9h, and an address select signal S11.

Figure 23:
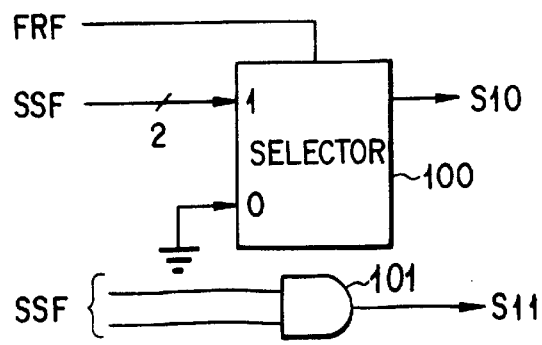
FIG. 23 is a block diagram showing a concrete example of the arrangement of a select signal generation section in FIG. 20.

In this case, a concrete example of the arrangement of the select signal generation section 9f will be described below with reference to FIG. 23. Referring to FIG. 23, for example, a 2-bit output process instruction signal SSF is input to one data input terminal of a selector circuit 100, and the other input terminal is grounded and always receives "0".

The selector circuit 100 further receives the unnecessary area detection signal FRF and selects data input any one of the two data input terminals of the selector circuit 100. More specifically, when the unnecessary area detection signal FRF is "1", the output process instruction signal SSF is selected, and the selector circuit 100 outputs a 2-bit image select signal S10. In addition, when the unnecessary area detection signal FRF is "0", the selector circuit 100 outputs "0" as the image select signal S10.

In this case, the output process instruction signal SSF is set to be "00" (binary expression) when any output processes ("removal", "density adjust", and "filtering") are not assigned to the target object; the output process instruction signal SSF is set to be "01" when "removal is assigned to the target object; the output process instruction signal SSF is set to be "10" when "density adjustment" is assigned to the target object; and the output process instruction signal SSF is set to be "11" when "filtering" is assigned to the target object.

The bit values of the output process instruction signal SSF are input to the two input terminals of an AND circuit 101, and the logical AND therebetween is output as the address select signal S11. Therefore, when the output process instruction signal SSF is "11", i.e., when "filtering" is assigned, the AND circuit 101 outputs "1" as the address select signal S11. Note that, when one of the other output processes is assigned, the address select signal S11 is set to be "0".

The image select signal S10 is input to the selector circuit 9g to select data input to any one of the four data input terminals of the selector circuit 9g.

For example, when the image select signal S10 is "00" (binary expression), any output processes ("removal", "density adjust", and "filtering") are not assigned to the target object, and the image data IID read from the image storage section 2 and input to the selector circuit 9g is directly output from the output terminal of the selector circuit 9g as an output image data OID. Similarly, when the image select signal S10 is "01" (binary expression), "removal" is assigned to the target object, and a pixel value "0" is output as the output image data OID. When the image select signal S10 is "10" (binary expression), "density adjustment" is assigned to the target object, and image data serving as an output from the density adjustment section 9b is output. When the image select signal S10 is "11" (binary expression), "filtering is assigned to the target object, image data serving as an output from the filtering section 9c is output. The output image data OID is input to the image output section 10.

The address (address in unit of pixel) of the object output from the control circuit 9a is input to the other data input terminal of the selector circuit 9h. The address select signal S11 generated by the select signal generation section 9f is input to the selector circuit 9h. The address select signal S11 is a control signal for selecting data input any one of the two data input terminals of the selector circuit 9h. For example, when "filtering" is assigned as an output process, the address select signal S11 is "1". At this time, in the selector circuit 9h, data input from the address generation means 9e is selected and output from the output terminal as an output address OAD. When the address select signal S11 is "0", an address output from the control circuit 9a is directly output from the control circuit 9a.

The output image data OID and the address OAD output from the selector circuits 9g and 9h are input to the output image storage section 9 (see FIG. 1).

As a result, the image of the target object which is input from the image input section 1, assigned as an unnecessary area through the man-machine interface 7 from the image of the original stored in the image storage section 2, and detected by the unnecessary area identifying section are cut and subjected to an output process assigned through the man-machine interface 7. Thereafter, the image is stored in the output image storage section 9 in correspondence with the original address of the object. When the above processes are performed to the target object assigned and detected as an unnecessary area, only a necessary area can be left, and the unnecessary area can be removed or suppressed.

The image output section 10 is an image data output device such as a laser printer for printing an image on a paper or the like on the basis of the image data OID processed by the output processing section 8 and stored in the output image storage section 9.

As described above, according to the present invention, there can be provided an image processing apparatus in which, when a copy image of the image of an original is to be formed, an unnecessary area in the image which need not be copied can be easily removed or suppressed.

Additional advantages and modifications will readily occur to those skilled in the art. Therefore, the invention in its broader aspects is not limited to the specific details, and representative devices shown and described herein. Accordingly, various modifications may be made without departing from the spirit or scope of th e general inventive concept as defined by the appended claims and their equivalents.

What is claimed is:

1. An image processing apparatus which reads an original image and performs an image process for forming a copy image corresponding to the original image, comprising:

means for reading the original image;

means for calculating characteristics of the original image;

means for identifying areas of unnecessary image information on the basis of the characteristics of the original image;

first inputting means for selecting one or more types of unnecessary areas of the original image to be corrected;

second inputting means for selecting an image process to be executed on each selected type of unnecessary area;

a plurality of image processing means for executing image processes on image data input thereto, wherein the image processes are different from each other;

means responsive to the second inputting means for causing the selected image processing means to operate on each selected type of unnecessary area of the original image;

means for displaying an identification result that identifies the areas of unnecessary image information of the original image; and means for correcting the areas of unnecessary image information which are identified by said identifying means and which correspond to selected types of unnecessary areas by using the selected image processing means, and for outputting a copy image having the selected types of unnecessary areas corrected.

2. An image processing apparatus according to claim 1, wherein said plurality of image processing means includes converting means for converting pixel values in the original image into pixel values set at 0.

3. An image processing apparatus according to claim 1, wherein said plurality of image processing means include density adjusting means for adjusting a density of the original image.

4. An image processing apparatus according to claim 1, wherein said plurality of image processing means include filter means for filtering the original image.

5. An image processing apparatus comprising:

means for scanning an original to generate an original image;

means for calculating a characteristic amount including the position and size of each object recorded on the original image;

means for storing unnecessary image information related to areas of the original image which are unnecessary for formation of a copy image;

means for comparing the position and size of the objects calculated by said characteristic amount calculating means with said unnecessary image information to identify whether the object is an unnecessary area; and means for, when said comparing means identifies the object as an unnecessary image, processing the object by one of a plurality of operator-selected image processes to form a copy image, wherein the image processes are different from each other.

6. An image processing apparatus according to claim 5, wherein said characteristic amount calculating means includes means for calculating a scanning range of said scanning means and an original range of the original image to determine an outside-of-original region on the basis of the scanning and original ranges, and said storage means has means for storing the outside-of-original region as unnecessary image information.

7. An image processing apparatus according to claim 5, wherein said characteristic amount calculating means includes means for checking, on the basis of the calculated position and size of the object, whether the object is an unnecessary image, and said storage means has means for storing, as the unnecessary image information, the position and size of an object determined to be an unnecessary image.

8. An image processing apparatus according to claim 5, wherein said characteristic amount calculating means includes means for checking, on the basis of projection information obtained by performing vertical/horizontal projection of the original image, the position and size of each object.

9. An image processing apparatus according to claim 5, wherein one of said operator-selected image processes includes filtering an object in the original image to form a copy image.

10. An image processing apparatus according to claim 5, wherein one of said operator-selected image processes includes adjusting the density of an object in the original image to form a copy image.

11. An image processing apparatus according to claim 5, further comprising:

man-machine interface means for permitting an operator to select image processes to be applied to unnecessary images.

12. An image processing apparatus according to claim 5, wherein one of said operator-selected image processes includes removing an object in the original image to form a copy image.

* * * * *